United States Patent
Khandekar et al.

(10) Patent No.: US 9,264,976 B2
(45) Date of Patent: *Feb. 16, 2016

(54) PREAMBLE DESIGN FOR A WIRELESS SIGNAL

(75) Inventors: Aamod Khandekar, San Diego, CA (US); Alexei Gorokhov, San Diego, CA (US); Naga Bhushan, San Diego, CA (US); Ravi Palanki, San Diego, CA (US); Ashwin Sampath, Skillman, NJ (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 607 days.

This patent is subject to a terminal disclaimer.

(21) Appl. No.: 12/260,856

(22) Filed: Oct. 29, 2008

(65) Prior Publication Data

US 2009/0129350 A1 May 21, 2009

Related U.S. Application Data

(60) Provisional application No. 60/988,665, filed on Nov. 16, 2007, provisional application No. 61/028,497, filed on Feb. 13, 2008, provisional application No. 60/988,720, filed on Nov. 16, 2007, provisional application No. 61/025,670, filed on Feb. 1, 2008, provisional application No. 61/047,021, filed on Apr. 22, 2008.

(51) Int. Cl.
*H04W 48/08* (2009.01)

(52) U.S. Cl.
CPC .................................. *H04W 48/08* (2013.01)

(58) Field of Classification Search
CPC ... H04W 72/04; H04W 72/044; H04W 16/00; H04W 16/02; H04W 16/10; H04W 16/14; H04W 16/16; H04L 72/0446; H04L 72/0473; H04L 5/0053; H04L 5/0032; H04L 5/0023; H04J 11/0056

USPC ............... 370/328, 333, 331, 343; 455/552.1; 715/764

See application file for complete search history.

(56) References Cited

U.S. PATENT DOCUMENTS

| 5,313,461 A | 5/1994 | Ahl et al. |
| 5,625,628 A | 4/1997 | Heath |

(Continued)

FOREIGN PATENT DOCUMENTS

| CN | 1322419 A | 11/2001 |
| CN | 1436434 A | 8/2003 |

(Continued)

OTHER PUBLICATIONS

Chen S. L., et al., "Capacity improvement in cellular systems with dynamic channel assignment and reuse partitioning" Personal, Indoor and Mobile Radio Communications, 2003. PIMRC 2003. 14th IEEE Proceedings on Sep. 7-10, 2003, IEEE, Piscataway, NJ, USA, vol. 2, Sep. 7, 2003, pp. 1441-1445, XP010679303.

(Continued)

*Primary Examiner* — Joseph Bednash
(74) *Attorney, Agent, or Firm* — Ashish L. Patel

(57) ABSTRACT

Providing for management of wireless communications in a heterogeneous wireless access point (AP) environment is described herein. By way of example, system data of an over-the-air message can be configured to include information identifying a distinct type of transmitting base station. In some aspects, the information can include an access type of the base station and/or a sector ID for distinguishing the base station among large numbers of other base stations. According to other aspects, the information can include wireless channel resources designated for a particular type of base station, or blanked by the transmitting base station, to facilitate interference reduction on such resources. By employing aspects of wireless communication management disclosed herein, efficient and reliable communication can be affected in large heterogeneous AP networks.

50 Claims, 12 Drawing Sheets

(56) References Cited

U.S. PATENT DOCUMENTS

| | | | |
|---|---|---|---|
| 5,822,696 A | 10/1998 | Bergkvist | |
| 5,953,323 A | 9/1999 | Haartsen | |
| 5,953,665 A | 9/1999 | Mattila | |
| 6,052,594 A | 4/2000 | Chuang et al. | |
| 6,134,231 A | 10/2000 | Wright | |
| 6,285,886 B1 | 9/2001 | Kamel et al. | |
| 6,351,643 B1* | 2/2002 | Haartsen | 455/450 |
| 6,393,295 B1 | 5/2002 | Butler et al. | |
| 6,522,628 B1 | 2/2003 | Patel et al. | |
| 6,556,582 B1 | 4/2003 | Redi | |
| 6,577,608 B1 | 6/2003 | Moon et al. | |
| 6,633,762 B1 | 10/2003 | Rauscher | |
| 6,724,815 B1 | 4/2004 | Jepsen et al. | |
| 6,728,217 B1 | 4/2004 | Amirijoo et al. | |
| 6,760,328 B1 | 7/2004 | Ofek | |
| 6,882,847 B2 | 4/2005 | Craig et al. | |
| 6,901,060 B1 | 5/2005 | Lintulampi | |
| 6,973,326 B2 | 12/2005 | Noh | |
| 7,042,856 B2 | 5/2006 | Walton et al. | |
| 7,072,313 B2 | 7/2006 | Kronz | |
| 7,145,890 B1* | 12/2006 | Seo et al. | 370/331 |
| 7,158,503 B1 | 1/2007 | Kalliojarvi et al. | |
| 7,356,049 B1 | 4/2008 | Rezvani | |
| 7,383,057 B1 | 6/2008 | Senarath et al. | |
| 7,400,642 B2 | 7/2008 | Koo et al. | |
| 7,474,643 B2 | 1/2009 | Malladi et al. | |
| 7,499,438 B2 | 3/2009 | Hinman et al. | |
| 7,640,013 B2 | 12/2009 | Okita et al. | |
| 7,966,033 B2 | 6/2011 | Borran et al. | |
| 2001/0053140 A1 | 12/2001 | Choi et al. | |
| 2002/0001299 A1 | 1/2002 | Petch et al. | |
| 2002/0012332 A1 | 1/2002 | Tiedemann, Jr. et al. | |
| 2002/0028675 A1 | 3/2002 | Schmutz et al. | |
| 2002/0034158 A1 | 3/2002 | Wang et al. | |
| 2002/0172208 A1 | 11/2002 | Malkamaki | |
| 2002/0181436 A1 | 12/2002 | Mueckenheim et al. | |
| 2002/0187804 A1 | 12/2002 | Narasimha et al. | |
| 2003/0123425 A1 | 7/2003 | Walton et al. | |
| 2003/0134655 A1 | 7/2003 | Chen et al. | |
| 2003/0227889 A1* | 12/2003 | Wu et al. | 370/335 |
| 2004/0203828 A1 | 10/2004 | Mirchandani et al. | |
| 2004/0240402 A1 | 12/2004 | Stephens | |
| 2004/0266339 A1 | 12/2004 | Larsson | |
| 2005/0002410 A1 | 1/2005 | Chao et al. | |
| 2005/0003796 A1 | 1/2005 | Kashiwase | |
| 2005/0068902 A1 | 3/2005 | Rath | |
| 2005/0079865 A1 | 4/2005 | Ahn et al. | |
| 2005/0197071 A1 | 9/2005 | Yoshida et al. | |
| 2005/0201325 A1 | 9/2005 | Kang et al. | |
| 2006/0019701 A1 | 1/2006 | Ji | |
| 2006/0084459 A1 | 4/2006 | Phan et al. | |
| 2006/0114877 A1 | 6/2006 | Heo et al. | |
| 2006/0133381 A1 | 6/2006 | Wang | |
| 2006/0172716 A1 | 8/2006 | Yoshii et al. | |
| 2006/0211441 A1 | 9/2006 | Mese et al. | |
| 2006/0215559 A1 | 9/2006 | Mese et al. | |
| 2006/0246936 A1 | 11/2006 | Gross et al. | |
| 2006/0251006 A1 | 11/2006 | Oliver | |
| 2006/0285522 A1 | 12/2006 | Kim et al. | |
| 2006/0286996 A1 | 12/2006 | Julian et al. | |
| 2007/0041429 A1 | 2/2007 | Khandekar | |
| 2007/0060057 A1 | 3/2007 | Matsuo et al. | |
| 2007/0064666 A1* | 3/2007 | Kwun et al. | 370/343 |
| 2007/0082619 A1 | 4/2007 | Zhang et al. | |
| 2007/0097897 A1 | 5/2007 | Teague et al. | |
| 2007/0105574 A1 | 5/2007 | Gupta et al. | |
| 2007/0105576 A1 | 5/2007 | Gupta et al. | |
| 2007/0115817 A1 | 5/2007 | Gupta et al. | |
| 2007/0135125 A1 | 6/2007 | Kim et al. | |
| 2007/0140168 A1 | 6/2007 | Laroia et al. | |
| 2007/0161389 A1 | 7/2007 | Khandekar | |
| 2007/0165575 A1 | 7/2007 | Niwano | |
| 2007/0168326 A1 | 7/2007 | Das et al. | |
| 2007/0173256 A1 | 7/2007 | Laroia et al. | |
| 2007/0217352 A1 | 9/2007 | Kwon | |
| 2007/0253355 A1* | 11/2007 | Hande et al. | 370/328 |
| 2007/0280170 A1 | 12/2007 | Kawasaki | |
| 2008/0039089 A1 | 2/2008 | Berkman et al. | |
| 2008/0039133 A1* | 2/2008 | Ma et al. | 455/552.1 |
| 2008/0057934 A1 | 3/2008 | Sung et al. | |
| 2008/0062925 A1 | 3/2008 | Mate et al. | |
| 2008/0069028 A1 | 3/2008 | Richardson | |
| 2008/0101301 A1 | 5/2008 | Thomas et al. | |
| 2008/0102822 A1 | 5/2008 | Feng et al. | |
| 2008/0130586 A1* | 6/2008 | Johnson et al. | 370/333 |
| 2008/0144577 A1* | 6/2008 | Huang et al. | 370/331 |
| 2008/0253355 A1* | 10/2008 | Tominaga et al. | 370/350 |
| 2009/0023477 A1 | 1/2009 | Staudte | |
| 2009/0061871 A1 | 3/2009 | Gross et al. | |
| 2009/0070694 A1* | 3/2009 | Ore et al. | 715/764 |
| 2009/0092178 A1* | 4/2009 | Sayana et al. | 375/227 |
| 2009/0129333 A1 | 5/2009 | Khandekar et al. | |
| 2009/0131098 A1 | 5/2009 | Khandekar et al. | |
| 2009/0135761 A1 | 5/2009 | Khandekar et al. | |
| 2009/0197588 A1 | 8/2009 | Khandekar et al. | |
| 2009/0203385 A1 | 8/2009 | Khandekar et al. | |
| 2010/0260163 A1 | 10/2010 | Machida | |
| 2014/0078992 A1 | 3/2014 | Khandekar et al. | |

FOREIGN PATENT DOCUMENTS

| | | |
|---|---|---|
| CN | 1518838 A | 8/2004 |
| CN | 1795645 A | 6/2006 |
| CN | 101043640 A | 9/2007 |
| EP | 1699199 A1 | 9/2006 |
| EP | 2217011 A1 | 8/2010 |
| FR | 2854009 A1 | 10/2004 |
| GB | 2353189 A | 2/2001 |
| JP | H08505033 A | 5/1996 |
| JP | 11252114 A | 9/1999 |
| JP | 2001028779 A | 1/2001 |
| JP | 2002111627 | 4/2002 |
| JP | 2002217819 A | 8/2002 |
| JP | 2002232353 A | 8/2002 |
| JP | 2004207983 A | 7/2004 |
| JP | 2005210703 A | 8/2005 |
| JP | 2005244906 A | 9/2005 |
| JP | 2007514445 A | 6/2007 |
| JP | 2007521694 A | 8/2007 |
| JP | 2007295356 A | 11/2007 |
| JP | 2008510437 A | 4/2008 |
| JP | 2008278264 A | 11/2008 |
| JP | 2009510970 A | 3/2009 |
| JP | 2010534099 A | 11/2010 |
| JP | 4941563 B2 | 5/2012 |
| KR | 100260457 B1 | 7/2000 |
| KR | 100765892 B1 | 10/2007 |
| RU | 2108673 | 4/1998 |
| RU | 2148891 C1 | 5/2000 |
| RU | 2183909 C2 | 6/2002 |
| RU | 2197779 C2 | 1/2003 |
| RU | 2004119813 A | 12/2005 |
| RU | 2276464 C2 | 5/2006 |
| WO | WO9416513 A1 | 7/1994 |
| WO | 9511559 A1 | 4/1995 |
| WO | 9833339 A2 | 7/1998 |
| WO | WO-9839940 | 9/1998 |
| WO | WO-9854919 A2 | 12/1998 |
| WO | WO9908464 A1 | 2/1999 |
| WO | WO-0010336 A2 | 2/2000 |
| WO | 00049828 | 8/2000 |
| WO | 0070786 A1 | 11/2000 |
| WO | WO0165749 | 9/2001 |
| WO | WO0176098 A2 | 10/2001 |
| WO | WO-02091597 A2 | 11/2002 |
| WO | WO03028245 A1 | 4/2003 |
| WO | WO2004006467 | 1/2004 |
| WO | 2005006586 A2 | 1/2005 |
| WO | 2005036914 | 4/2005 |
| WO | WO2005043866 A1 | 5/2005 |
| WO | WO-2005059111 A2 | 6/2005 |
| WO | WO2005101888 | 10/2005 |
| WO | WO2005109705 | 11/2005 |
| WO | WO2006023536 A2 | 3/2006 |

(56) References Cited

FOREIGN PATENT DOCUMENTS

| WO | 2006045097 A2 | 4/2006 | | |
|---|---|---|---|---|
| WO | 2006096421 | 9/2006 | | |
| WO | 2007022631 | 3/2007 | | |
| WO | WO2007024895 | 3/2007 | | |
| WO | WO 2007/043096 A1 * | 4/2007 | ............... | H04Q 7/36 |
| WO | WO-2007040450 A1 | 4/2007 | | |
| WO | WO2007044281 | 4/2007 | | |
| WO | 2007051182 | 5/2007 | | |
| WO | WO2007078177 | 7/2007 | | |
| WO | WO2007078199 A1 | 7/2007 | | |
| WO | WO2007092771 | 8/2007 | | |
| WO | WO-2007114966 | 10/2007 | | |
| WO | WO-2007114996 A1 | 10/2007 | | |
| WO | 2007123519 | 11/2007 | | |
| WO | WO2008113966 | 9/2008 | | |
| WO | WO-2009054058 A1 | 4/2009 | | |
| WO | WO-2009064648 A1 | 5/2009 | | |

OTHER PUBLICATIONS

Cruz-Perez, et al., "Frequency reuse and distributed dynamic channel assignment in microcellular systems" IEEE International Symposium on Personal, Indoor and Mobile Radio Communications, Sep. 1, 1997, pp. 415-419, XP010247680.

Dae N. B., et al., "Channel state-aware joint dynamic cell coordination scheme using adaptive modulation and variable reuse factor in OFDMA downlink" Telecommunication Systems, vol. 36, No. 1-3, Dec. 4, 2007, pp. 85-96, XP019581250.

Elayoub, et al., "Performance evaluation of frequency planning schemes in OFDMA-based networks" IEEE Transactions on Wireless Communications, vol. 7, No. 5, May 2008, pp. 1623-1633, XP011215006.

Halpern, "Reuse partitioning in cellular systems" IEEE Vehicular Technology Conference, Jan. 1983, pp. 322-327, XP002096008.

Jia, et al., "On the Performance of IEEE 802.16 OFDMA System Under Different Frequency Reuse and Subcarrier Permutation Patterns" IEEE International Conference on Communications, Jun. 2007, pp. 5720-5725, XP031126581.

Johansson, "Dynamic Reuse Partitioning Within Cells Based on Local Channel and Arrival Rate Fluctuations" IEEE Transactions on Vehicular Technology, vol. 57, No. 2, Mar. 2008, pp. 1155-1165, XP011201845.

Kataoka, et al., "Channel information assisted reuse partitioning-a distributed dynamic channel assignment algorithm based on reuse partitioning" International Conference on Universal Personal Communications, Sep. 27, 1994, pp. 536-540, XP010131611.

Kiani, et al., "Maximizing Multicell Capacity Using Distributed Power Allocation and Scheduling" IEEE Wireless Communications and Networking Conference, Mar. 11, 2007, pp. 1692-1696, XP031097456.

Klerer: "802.20 harmonized draft editing group version" IEEE P802.20-D3.0, Apr. 3, 2007, pp. 1-1 149, XP040393818 Piscataway, US.

Wang, M., et al., "Preamble Design in Ultra Mobile Broadband Communication Systems" IEEE International Workshop on Signal Design and Its Applications in Communications, Sep. 23, 2007, pp. 328-333, XP031194263.

Mitsubishi Electric, "Combined fixed and adaptive soft-frequency reuse for inter-cell interference coordination" 3GPP Draft R1-083615, Sep. 28, 2008, XP050316974 Sophia-Antipolis, FR [retrieved on Sep. 23, 2008].

Neung-Hyung Lee, et al., "Channel allocation considering the interference range in multi-cell OFDMA downlink systems" Communication Systems Software and Middleware, 2007. Comsware 2007. 2N D International Conference on, IEEE, PI, Jan. 2007, pp. 1-6, XP031113903.

Onoe, et al., "Flexible re-use for dynamic channel assignment in mobile radio systems" International Conference on Communications, Jun. 11, 1989, pp. 472-476, XP010081098.

Qualcomm Europe: "Description and simulations of interference management" 3GPP Draft R1-050896, Aug. 24, 2005, XP050100516 Sophia-Antipolis, FR. pp. 1-10.

Rahman, et al., "Interference Avoidance through Dynamic Downlink OFDMA Subchannel Allocation using Intercell Coordination" IEEE Vehicular Technology Conference, May 11, 2008, pp. 1630-1635, XP031255841.

Seok H. W., et al., "Inter-Cell Interference Coordination/Avoidance for Frequency Reuse by Resource Scheduling in an OFDM-Based Cellular System" IEEE Vehicular Technology Conference, Sep. 1, 2007, pp. 1722-1725, XP031147702.

Steven L. C., et al., "Dynamic Channel Assignment with Flexible Reuse Partitioning in Cellular Systems" Wireless Personal Communications, vol. 42, No. 2, Aug. 16, 2006, pp. 161-183, XP019509800.

Stolyar, et al., "Self-Organizing Dynamic Fractional Frequency Reuse in OFDMA Systems" IEEE Conference on Computer Communications, Apr. 13, 2008, pp. 691-699, XP031263869.

Wang, et al., "Interference Management and Handoff Techniques in Ultra Mobile Broadband Communication Systems" IEEE International Symposium Onspread Spectrum Techniques and Applications, Aug. 25, 2008, pp. 166-172, XP031319003.

Young-June Coi., et al., "Flexible Design of Frequency Reuse Factor in OFDMA Cellular Networks" IEEE International Conference on Communications, Jun. 2006, pp. 1784-1788, XP031025320.

International Search Report, PCT/US2008/082521—International Search Authority—European Patent Office, Mar. 31, 2009.

Written Opinion, PCT/US2008/082521—International Search Authority—European Patent Office. Mar. 31, 2009.

Taiwan Search Report—TW097144283—TIPO—Sep. 15, 2012.

Jette, et al., "UMBFDD Draft Technology Overview, IEEE C802.20-07/09", IEEE 802.20 Working Group on Mobile Broadband Wireless Access, Mar. 5, 2007, pp. 1-34.

Qualcomm Europe: "Restricted Association for HNBs", R2-075125, 3GPP TSG-RAN WG2 #59bis, Nov. 9, 2007.

Taiwan Search Report—TW102102271—TIPO—Aug. 7, 2014.

Wang M, "Preamble Design in Ultra Mobile Broadband Communication Systems, Signal Design and Its Applications in Communications," 2007. IWSDA 2007. 3rd International Workshop on, Sep. 23, 2007, URL: http://ieeexplore.ieee.org/stamp/stamp.jsp?tp=&arnumber=4408390UMBFDD Draft Technology Overview, IEEE C802.20-07/09, Mar. 11, 2007, pp. 4-11, URL : http://grouper.ieee.org/groups/802/20/Contribs/C802.20-07-09.pdf.

Taiwan Search Report—TW101145343—TIPO—Nov. 20, 2014.

* cited by examiner

PREAMBLE DESIGN FOR A WIRELESS SIGNAL

CLAIM OF PRIORITY UNDER 35 U.S.C. §119

The present application for patent claims priority to the following U.S. Provisional Applications:

U.S. Provisional Application No. 60/988,665 entitled FEMTO PREAMBLE DESIGN filed Nov. 16, 2007;

U.S. Provisional Application No. 61/028,497 entitled ADAPTIVE ALGORITHMS FOR INTERFERENCE MANAGEMENT MESSAGING WITH INTER-SECTOR FAIRNESS IN A WIRELESS NETWORK filed Feb. 13, 2008;

U.S. Provisional Application No. 60/988,720 entitled FEMTO PREAMBLE DESIGN filed Nov. 16, 2007;

U.S. Provisional Application No. 61/025,670 entitled AIR-INTERFERENCE AND BACKHAUL SIGNALING APPROACHES FOR INTERFERENCE AVOIDANCE MESSAGES filed Feb. 1, 2008; and U.S. Provisional Application No. 61/047,021 entitled SYSTEMS AND METHODS TO ENABLE AIR-INTERFERENCE AND BACKHAUL SIGNALING FOR INTERFERENCE AVOIDANCE MESSAGES filed Apr. 22, 2008, each of which are assigned to the assignee hereof and hereby expressly incorporated by reference herein.

REFERENCE TO CO-PENDING APPLICATIONS FOR PATENT

The present application for patent is related to the following co-pending U.S. patent applications:

"SECTOR INTERFERENCE MANAGEMENT BASED ON INTER-SECTOR PERFORMANCE" by Aamod Khandekar et al., having Ser No. 12/260,834, filed concurrently herewith, assigned to the assignee hereof, and expressly incorporated by reference herein;

"PREAMBLE DESIGN FOR A WIRELESS SIGNAL" by Aamod Khandekar et al., having Ser. No. 12/260,826, filed concurrently herewith, assigned to the assignee hereof, and expressly incorporated by reference herein;

"BACKHAUL SIGNALING FOR INTERFERENCE AVOIDANCE" by Aamod Khandekar et al., having Ser. No. 12/260,849, filed concurrently herewith, assigned to the assignee hereof, and expressly incorporated by reference herein "PREAMBLE DESIGN FOR A WIRELESS SIGNAL" by Aamod Khandekar et al., having Ser. No. 12/260,861, filed concurrently herewith, assigned to the assignee hereof, and expressly incorporated by reference herein; and "PREAMBLE DESIGN FOR A WIRELESS SIGNAL" by Aamod Khandekar et al., having Ser. No. 12/260,868, filed concurrently herewith, assigned to the assignee hereof, and expressly incorporated by reference herein.

BACKGROUND

I. Field

The following relates generally to wireless communication, and more specifically to preamble design of a wireless signal facilitating reduced interference for semi-planned or unplanned wireless access networks.

II. Background

Wireless communication systems are widely deployed to provide various types of communication content such as, e.g., voice content, data content, and so on. Typical wireless communication systems can be multiple-access systems capable of supporting communication with multiple users by sharing available system resources (e.g., bandwidth, transmit power). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

Wireless transmissions are typically sub-divided in time, frequency, according to codes, and so on, to convey information. For instance, in an ultra mobile broadband (UMB) system, forward link messages comprise at least one time superframe (e.g., of 25 millisecond length) segmented into one superframe preamble and several time frames. The preamble carries acquisition and control information, while the various other time frames carry traffic, such as voice information pertinent to a voice call, data packets pertinent to a data call or data session, or the like. Acquisition information can be utilized by mobile terminals within a given mobile network sector to identify transmitting base stations within the sector. Control channel information provides commands and other instructions for decoding received signals.

In UMB, a superframe preamble comprises eight orthogonal frequency division multiplex (OFDM) symbols. The first symbol typically carries a forward primary broadcast control channel (F-PBCCH) and the next four symbols can carry a forward secondary broadcast control channel (F-SBCCH) and forward quick paging channel (P-QPCH). The F-PBCCH and F-SBCCH typically provide initial configuration information required by terminals entering a UMB system. For instance, the F-PBCCH channel might carry deployment-wide configuration information that is common across sectors, while the F-SBCCH might carry sector-specific configuration information. The F-QPCH can carry quick pages which are used to direct idle mode terminals to read a page and open a connection if a page is received.

The last three OFDM symbols of the UMB preamble can carry acquisition pilot information. The first of these three symbols typically carries a sector-independent signal used to determine the existence of a UMB system and to acquire initial timing and frequency. A second, sector-dependent signal can be utilized to determine identity of a transmitting sector and/or base station. A third signal, also sector-dependent, can carry information used to determine initial system parameters such as whether the system is synchronous or asynchronous, what time division duplex (TDD) partition to use, and so on.

While the foregoing describes a preamble for a UMB system, various other mobile communication systems also utilize channel preambles, or similar structures, for signaling, acquisition, control or like wireless communication functions. Specifically, a preamble can carry synchronization and/or acquisition pilots, control information enabling a remote terminal to search for a sector at power-up, determine initial parameters of a sector necessary for making handoff decisions, establishing communication with a network, and demodulating non-control channels. Other functions can include specifying formats of traffic channels for some wireless systems. Typically, a preamble is set apart from a traffic-related portion of a wireless signal to facilitate distinction of application-related information and control information at a receiver. Thus, the receiver can monitor control portions to identify whether a signal contains traffic pertinent to a receiving device, without having to monitor the traffic portions themselves. Because the control portion is typically only a small fraction of the total signal, receiver devices can significantly reduce processing requirements and power consumption by monitoring a signal preamble to determine whether relevant information is contained in the signal. Employing control channels for wireless signaling therefore leads to more effective communication, as well as improved mobility by extending battery life for mobile devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The subject disclosure provides for management of wireless communications in a heterogeneous wireless access point (AP) environment. A preamble transmitted by an AP (e.g., a base station [BS]) can comprise information identifying a distinct type of the AP. In some aspects, the information can include a bit indicating a restricted/unrestricted access type of the AP. Accordingly, a terminal receiving the preamble can determine whether to communicate with the AP as a serving AP, include the AP in an active set for handoff determinations, consider signals sent by the AP as noise, or the like. In another aspect, the information can include a unique sector ID of the AP, which can identify the AP even in a wireless access network (AN) having hundreds or thousands of APs. Alternatively, or in addition, the information can include a semi-unique sector ID that is distinct at least within a tracking area, routing area or frequency band of the wireless AN. In at least one aspect of the subject disclosure, the unique or semi-unique ID can comprise a distinct value of a 64-bit code. According to still other aspects, the information can include wireless channel resources blanked by the AP, to facilitate interference reduction on such resources. By employing aspects of wireless communication management disclosed herein, efficient and reliable communication can be affected in large heterogeneous AP networks.

According to further aspects of the subject disclosure, provided is a method of wireless communication. The method can comprise generating a preamble for a wireless signal, the preamble comprises network overhead information pertinent to a BS transmitting the wireless signal. The method can further comprise including information within the preamble that identifies an access type of the BS.

In other aspects, disclosed is an apparatus that facilitates wireless communication. The apparatus can comprise a communication processor that generates a preamble for a wireless signal, the preamble comprises network overhead information pertinent to a BS transmitting the wireless signal. Additionally, the apparatus can comprise a context module that includes information within the preamble that identifies an access type of the BS and memory coupled to the communication processor.

According to still other aspects, provided is an apparatus for wireless communication. The apparatus can comprise means for generating a preamble for a wireless signal, the preamble comprises network overhead information pertinent to a BS transmitting the wireless signal. Further, the apparatus can comprise means for including information within the preamble that identifies an access type of the BS.

According to one or more other additional aspects, disclosed is at least one processor configured for wireless communication. The processor(s) can comprise a first module configured to generate a preamble for a wireless signal, the preamble comprises network overhead information pertinent to a base station (BS) transmitting the wireless signal. The processor(s) can further comprise a second module configured to include information within the preamble that identifies an access type of the BS.

According to at least one further aspect, provided is a computer program product comprising a computer-readable medium. The computer-readable medium can comprise a first set of codes for causing a computer to generate a preamble for a wireless signal, the preamble comprises network overhead information pertinent to a BS transmitting the wireless signal. Furthermore the computer-readable medium can comprise a second set of codes for causing a computer to include information within the preamble that identifies an access type of the BS.

In addition to the foregoing, provided is a method of facilitating wireless communication. The method can comprise obtaining a wireless signal from a non-serving sector of a wireless AN and scanning one or more portions of the wireless signal for system data. The method can further comprise extracting information from the system data that identifies an access type of BS associated with the non-serving sector.

According to further aspects, disclosed is an apparatus that facilitates wireless communication. The apparatus can comprise a receiver that obtains a wireless signal from a non-serving sector of a wireless AN. The apparatus can additionally comprise a data processor that scans one or more portions of the wireless signal for system data and extracts information from the system data that identifies an access type of BS associated with the non-serving sector.

In at least one other aspect, disclosed is an apparatus configured to facilitate wireless communication. The apparatus can comprise means for obtaining a wireless signal from a non-serving sector of a wireless AN and means for scanning one or more portions of the wireless signal for system data. Furthermore, the apparatus can comprise means for extracting information from the system data that identifies an access type of BS associated with the non-serving sector.

According to other aspects, provided is at least one processor configured to facilitate wireless communication. The processor(s) can comprise a first module configured to obtain a wireless signal from a non-serving sector of a wireless AN and a second module configured to scan one or more portions of the wireless signal for system data. Moreover, the processor can comprise a third module configured to extract information from the system data that identifies an access type of BS associated with the non-serving sector.

According to still other aspects, provided is a computer program product comprising a computer-readable medium. The computer-readable medium can comprise a first set of codes for causing a computer to obtain a wireless signal from a non-serving sector of a wireless AN. Additionally, the computer-readable medium can comprise a second set of codes for causing the computer to scan one or more portions of the wireless signal for system data. Moreover, the computer-readable medium can comprise a third set of codes for causing the computer to extract information from the system data that identifies an access type of BS associated with the non-serving sector.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
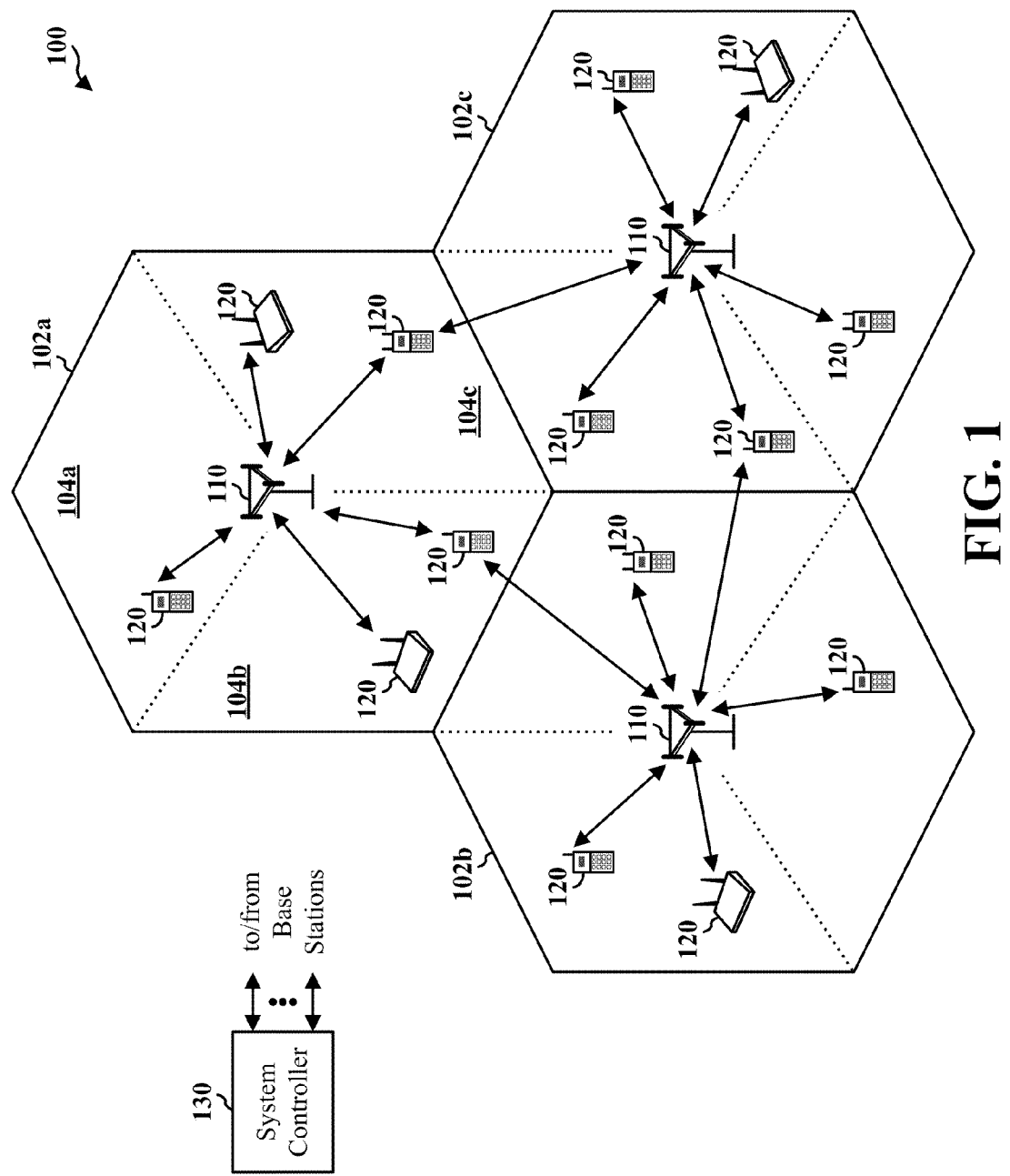
FIG. 1 illustrates a block diagram of an example system that provides wireless communication in accordance with aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of employing a signal preamble to identify a type of base station transmitting a wireless signal. One skilled in the art should appreciate that similar techniques could apply to other communication environments.

As utilized herein, a preamble of a wireless transmission is a signaling message that provides pilot and/or control channel information for terminals served by a neighboring base station (or, e.g., any terminal not served by a base station transmitting the wireless transmission). The neighboring terminals can demodulate the preamble to obtain operating data pertinent to the transmitting base station. Accordingly, as utilized herein, a preamble is distinct from serving cell wireless transmissions, including broadcast or unicast transmissions, comprising data for terminals served by the transmitting base station. Serving cell transmissions are demodulated by terminals served by the serving cell, to implement mobile operations such as paging, location tracking, handoff, voice and/or data services, and so on.

Planned deployments of wireless access points (APs) in a wireless access network (AN) typically consider position, spacing and transmission/receive characteristics of transceiver devices. One goal of planned deployment is to reduce interference among transmitters. Thus, for instance, two base stations might be spaced apart a distance similar to a maximum transmit range of their respective transmitters. Accordingly, interference from one base station at the other can be minimized.

In unplanned or semi-planned AP deployments, wireless transmitters are often not spaced considering their transmit power, transmit direction, or like characteristics. Instead, it might not be unusual for two or more similarly transmitting APs (e.g., that transmit into substantially 360 degrees) to be in close proximity of each other. Furthermore, in heterogeneous transmit power environments, a high power AP (e.g., macro cell at 20 watts) may be situated proximate a mid or low power transmitter (e.g., pico cell, femto cell, etc., of varying transmission power, e.g., 1 watt). The higher power transmitter can be a significant source of interference for the low power transmitters. Furthermore, depending on proximity of a receiver to the low power transmitter(s), significant interference for the high power transmitter can result as well. Accordingly, signal interference in semi or un-planned environments and/or heterogeneous transmit power environments can often be a significant problem as compared with the conventional planned macro base station AN.

In addition to the foregoing, restricted access (RA) BSs can compound problems resulting from semi and un-planned AP deployment. An RA BS can selectively provide access to one or more terminal devices. RA BSs can also be termed private BSs, closed group stations or some similar terminology. An RA BS can be useful installed privately in a home, at an office, etc., that utilizes private networking resources of an individual, business, or the like. Owners of such a BS might not want those resources being utilized by general access mobile users; accordingly, an RA BS can limit access to pre-specified terminal devices, preserving resources for authorized users.

Un-planned, heterogeneous and RA deployments can lead to poor geometrical conditions for a wireless AN. Even without restricted association, a device that observes a very strong signal from a macro BS could prefer to connect to a pico BS, because the pico BS is "closer" to the terminal in terms of path-loss. Thus, the pico BS is capable of serving the terminal at a comparable data rate while causing less interference to the wireless AN. However, a terminal monitoring the pico BSs signal (e.g., a preamble comprising control and acquisition information) will observe significant interference from the macro BS, resulting in a low signal to noise ratio (SNR) at the terminal (e.g., possibly rendering the pico BS undetectable by the BS).

Additional problems result when an RA BS is introduced into the GA BS environment. In such a case, a terminal device can be very close to a BS to which it is not allowed to connect. Accordingly, this BS will cause very strong interference (and, e.g., resulting in very low SNR) for a BS serving the terminal (e.g., the closest BS the terminal is allowed to connect to). In some cases, the interference can be so strong as to desensitize an analog to digital (A/D) converter of the terminal. For instance, components of the terminal can typically be set based on total received signal plus an interference level (which, e.g., can be dominated by the RA BS in the above scenario). A signal level of the serving BS can be so low as to be below a quantization noise level. In this case, even if the interfering BS is present on different frequency resources (e.g., a different sub-carrier or set of sub-carriers) than the serving BS, the interfering BS can still render the serving BS undetectable at the terminal, the latter being masked by quantization noise.

In order to alleviate some of the interference in heterogeneous ANs, some BSs can transmit at reduced power on one or more portions of the communication bandwidth of a wireless signal (or, e.g., transmit with no power on, or blank, those portions). In some aspects of the disclosure, the portions of the communication bandwidth can comprise one or more time frames, frequency sub-bands, and/or code sub-divisions of the wireless signal. As an example, an interlace of the wireless signal, which comprises every '$k^{th}$' time frame of the signal (e.g., every $8^{th}$ frame can comprise an interlace in some systems), can be reserved or preferred for low power and/or RA BSs. Such BSs can transmit at full power on the reserved/preferred interlace. Other BSs, such as a macro and/or GA BS, can blank/transmit at reduced power on the restricted/preferred interlace, respectively. Accordingly, terminals will observe little or no interference from at least the macro BS on the restricted/preferred interlace. This can provide a cell splitting benefit since many more pico or femto BSs can use the same bandwidth that a single macro cell BS would otherwise use, improving data rates available in the network.

A BS blanking portions of the communication bandwidth can, according to some aspects of the disclosure, advertise portions of the wireless signal that are blanked or where reduced power transmission is implemented. In one aspect, a bitmap can be broadcast in a preamble explicitly indicating which portions (e.g., interlaces) are blanked/transmitted with reduced power. In another aspect, the BS can indicate a number of portions it reserves, where the specific portions are implicitly understood by a terminal based on the number. The advertisement can be sent in a preamble of the wireless signal, so that terminals can obtain the advertisement utilizing only sufficient power required to monitor the preamble of the message.

In at least one aspect of the subject disclosure, a preamble of a wireless signal (or, e.g., other data of the wireless signal where suitable) can be transmitted with low resource re-use (or low re-use), referred to as a low re-use preamble (or low re-use data transmission). As utilized herein, low resource re-use refers to employing only a portion of time, frequency, code and/or symbol-based resources of a particular time cycle of a wireless signal. Thus, for instance, low re-use can involve transmitting data on three or fewer of four frequency sub-bands associated with one time frame of the particular time cycle. Full re-use (or, e.g., non re-use), on the other hand, refers to employing all resources of at least one time frame of the particular time cycle (optionally excluding buffer frequencies utilized to reduce interference in neighboring frequency channels). Thus, in the foregoing example, full re-use employs all four of the frequency sub-bands to transmit the data Another problem with heterogeneous wireless ANs is that terminals might not know what type of BS a received signal originates from. Thus, based solely on transmission parameters such as signal loss, interference, path loss, etc., to a RA BS, a terminal can choose to access a mobile network via the RA BS. Significant time and signaling can be lost determining that the terminal does not, in fact, have authorization to use the RA BS, or only has limited authorization (e.g., limited bandwidth, limited application accessibility, limited network accessibility, and so on). Accordingly, additional inefficiencies can result when RA and GA BSs overlap in a wireless AN. To address this problem, a BS can transmit data indicating whether a transmitting BS is a GA or RA BS. The data can be included in a preamble of a wireless signal and can be utilized by a terminal in synchronizing with a particular BS.

Further to the above, because RA BSs and small, low power GA BSs can be deployed in an unplanned or semi-planned manner, large numbers of such BSs can co-exist in a particular wireless AN (e.g., hundreds or even thousands of such BSs can exist in densely populated areas). For instance, where individual home-owners set up personal RA BSs for their homes/apartments, similar to wireless local area network (WLAN) APs in a residential area, a great number of such BSs can be seen by a terminal in the residential area (or, e.g., in a high-rise apartment complex). As a result, overlap can occur in synchronization signals that typically include some data to distinguish APs of a wireless AN, leading to ID collisions. To address this problem, a unique or semi-unique sector ID can be incorporated into a preamble of a wireless signal. The terminal can monitor the preamble to obtain the sector ID, and utilize such ID in cell selection, handoff determinations, determining an active set of BSs, or the like. As utilized herein, the term unique refers to a code or other distinguishing identifier that is unique among all access points of an operator's wireless network, optionally within the confines of a particular state or country (e.g., so a code can optionally be re-used in different countries where the operator deploys network infrastructure, but not within the same state/country and within the same operator's network). Semi-unique, on the other hand, refers to a code that is distinct at least among access points within a common location area or routing area of a network, or distinct at least among access points sharing a common frequency band employed by the wireless network.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process and/or thread of execution and a module can be localized on one electronic device and/or distributed between two or more electronic devices. Further, these modules can execute from various computer-readable media having various data structures stored thereon. The modules can communicate by way of local and/or remote processes such as in accordance with a signal having one or more data packets (e.g., data from one component interacting with another component in a local system, distributed system, and/or across a network such as the Internet with other systems by way of the signal). Additionally, components or modules of systems described herein can be rearranged and/or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a user terminal—UT. A UT can also be called a system, a subscriber unit, a subscriber station, mobile station, mobile, mobile communication device, mobile device, remote station, remote terminal, access terminal (AT), user agent (UA), a user device, or user equipment (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more application specific integrated circuits (ASICs), digital signal processors (DSPs), digital signal processing devices (DSPDs), programmable logic devices (PLDs), field programmable gate arrays (FPGAs), discrete gate or transistor logic, discrete hardware components, general purpose processors, controllers, microcontrollers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps and/or actions of a method or algorithm can reside as at least one or any combination or set of codes and/or instructions on a machine-readable medium and/or computer-readable medium, which can be incorporated into a computer program product. The term "article of manufacture" as used herein is intended to encompass a computer program accessible from any computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the Figures, FIG. 1 illustrates a wireless communication system 100 with multiple BSs 110 (e.g., wireless APs) and multiple terminals 120 (e.g., UTs), such as can be utilized in conjunction with one or more aspects. A BS (110) is generally a fixed station that communicates with the terminals and can also be called an access point, a Node B, or some other terminology. Each BS 110 provides communication coverage for a particular geographic area or coverage area, illustrated as three geographic areas in FIG. 1, labeled 102a, 102b, and 102c. The term "cell" can refer to a BS and/or its coverage area depending on the context in which the term is used. To improve system capacity, a BS geographic area/coverage area can be partitioned into multiple smaller areas (e.g., three smaller areas, according to cell 102a in FIG. 1), 104a, 104b, and 104c. Each smaller area (104a, 104b, 104c) can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the following description, unless specified otherwise, the term "base station" is used generically for a fixed station that serves a sector as well as a fixed station that serves a cell.

Terminals 120 are typically dispersed throughout the system, and each terminal 120 can be fixed or mobile. Terminals 120 can also be called a mobile station, user equipment, a user device, or some other terminology, as describe above. A terminal 120 can be a wireless device, a cellular phone, a personal digital assistant (PDA), a wireless modem card, and so on. Each terminal 120 can communicate with zero, one, or multiple base stations 110 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 130 couples to base stations 110 and provides coordination and control for BSs 110. For a distributed architecture, BSs 110 can communicate with one another as needed (e.g., by way of a backhaul network communicatively coupling the BSs 110). Data transmission on the forward link often occurs from one access point to one access terminal at or near the maximum data rate that can be supported by the forward link and/or the communication system. Additional channels of the forward link (e.g., control channel) can be transmitted from multiple access points to one access terminal. Reverse link data communication can occur from one access terminal to one or more access points.

Figure 2:
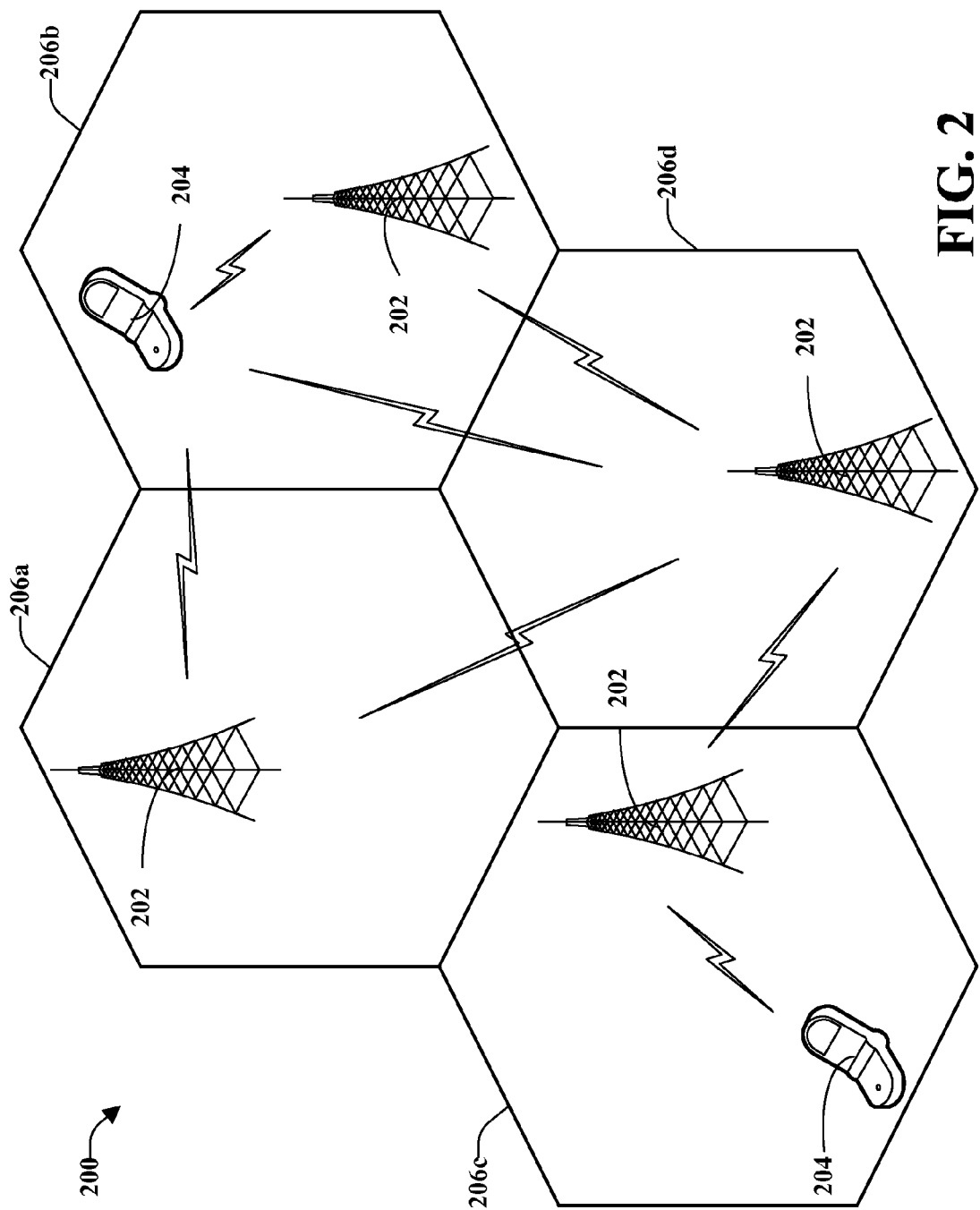
FIG. 2 depicts a block diagram of an example communication apparatus for employment with a wireless communication environment.

FIG. 2 is an illustration of an ad hoc or unplanned/semi-planned wireless communication environment 200, in accordance with various aspects. System 200 can comprise one or more BSs 202 in one or more cells and/or sectors that receive, transmit, repeat, etc., wireless communication signals to each other and/or to one or more mobile devices 204. As illustrated, each BS 202 can provide communication coverage for a particular geographic area, illustrated as four geographic areas, labeled 206a, 206b, 206c and 206d. Each BS 202 can comprise a transmitter chain and a receiver chain, each of which can in turn comprise a plurality of components associated with signal transmission and reception (e.g., processors, modulators, multiplexers, demodulators, demultiplexers, antennas, and so forth), as will be appreciated by one skilled in the art. Mobile devices 204 can be, for example, cellular phones, smart phones, laptops, handheld communication devices, handheld computing devices, satellite radios, global positioning systems, PDAs, and/or any other suitable device for communicating over wireless network 200. System 200 can be employed in conjunction with various aspects described herein in order to facilitate providing and/or utilizing synchronized wireless signal transmission in a wireless communication environment (200), as set forth herein.

Figure 3:
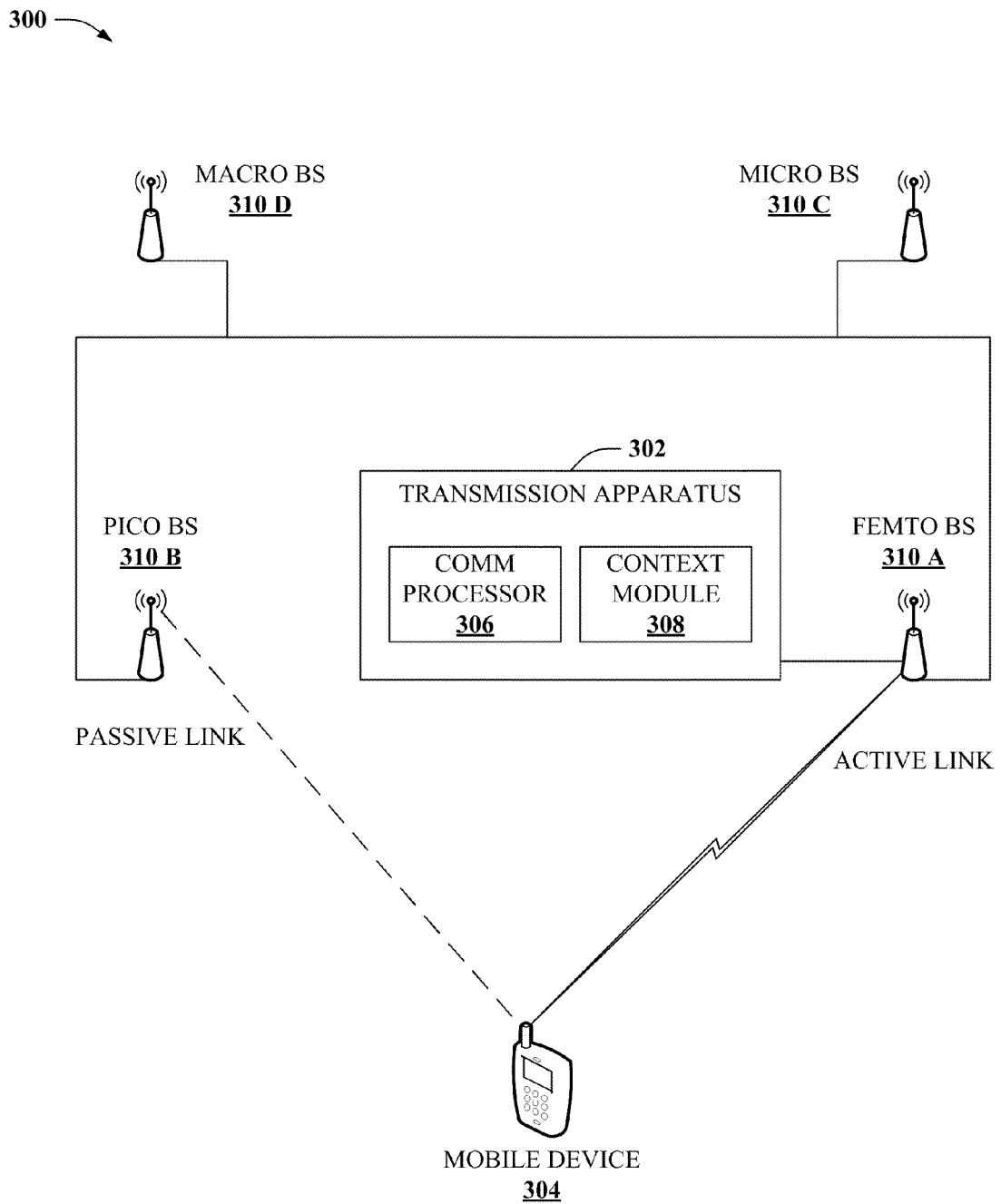
FIG. 3 illustrates a block diagram of an example system comprising a heterogeneous access network (AN) according to aspects of the subject disclosure.

FIG. 3 illustrates a block diagram of an example system 300 comprising a heterogeneous AN according to aspects of the subject disclosure. The system 300 comprises a transmission apparatus 302 that can configure wireless signals transmitted by one or more APs (310A, 310B, 310C, 310D) of the wireless AN. Specifically, the transmission apparatus 302 can configure a preamble of such wireless signals to include information that facilitates communication with devices (304) in the heterogeneous AN.

In one or more aspects of the subject disclosure, transmission apparatus 302 can include a communication processor 206 that can generate a preamble for a wireless signal. The preamble can comprise network overhead information. Such information can include synchronization signals (e.g., primary synchronization channel [PSC] and secondary synchronization channel [SSC], of a third generation partnership project [3GPP] long term evolution [LTE] system, PBCCH and SBCCH of an ultra mobile broadband [UMB] system, or other synchronization/acquisition signals of other mobile network systems etc.), control channel signals (e.g., a forward primary broadcast control channel [F-PBCCH] and/or a forward secondary broadcast control channel [F-SBCCH] as used in a UMB system), and the like, suitable for a particular type of wireless AN (e.g., LTE, UMB, global system for mobile communication [GSM], universal mobile telecommunications system [UMTS], wideband code division multiple access [W-CDMA], and so on). Furthermore, transmission apparatus 302 can include a context module 308 that includes information pertinent to a distinct type of transmitting BS (310A, 310B, 310C, 310D) into the preamble of the wireless signal. According to some aspects, the information can include data indicating an access type of the transmitting BS 310A. For example, a bit can specify whether the transmitting BS 310A is a GA BS or a RA BS. Accordingly, a receiving mobile device 304 can monitor the preamble of the wireless signal to determine whether it should access the transmitting BS 310A. If the data indicates the BS is GA, mobile device 304 can select the BS for communication. If the data indicates the BS is RA, mobile device 304 can attempt to access the BS 310A, obtain additional information, ignore the BS 310A (e.g., if the device 304 determines it is not authorized to access the RA BS), or other suitable actions.

In some aspects of the disclosure, context module 308 can include the data identifying access type in an acquisition pilot of the wireless signal preamble (e.g., a TDM3 pilot of a UMB system) utilized to transmit system determination information. In other aspects, the data can be included in control channel information incorporated in the preamble (e.g., F-PBCCH, F-SBCCH, etc.). It should be appreciated, however, that the information identifying access type of the transmitting BS can be incorporated into any suitable portion of the wireless signal preamble, as described herein or made known to one of skill in the art by way of the context provided herein.

According to some aspects, the mobile device 304 can query the transmitting BS 310A to determine whether the device 304 is authorized to access the BS 310A. The query can submit ID information of the mobile device 304 to identify the device 304. Alternatively, or in addition, the query can request a closed access group (CAG) of an RA BS (310A) to determine whether the mobile device 304 is authorized on the RA BS (310A). In some aspects, a response to the query can indicate the mobile device 304 is authorized, not authorized, or has limited access. Limited access can include a 'soft' restriction, indicating that the mobile device 304 can obtain limited services from the RA BS (310A). Limited services can comprise, for instance, voice only service, limited data rates for data services, limited application support, limited network access, and so forth. The query response from the RA BS (310A) can be broadcast in a separate portion of the wireless signal preamble, or communicated to the mobile device 304 via unicast messaging.

According to one or more further aspects, context module 308 can incorporate a unique or semi-unique sector ID, as defined supra, of the transmitting BS 310A with the information pertinent to the distinct type of the BS (310A). The unique sector ID can uniquely identify the BS (310A) on the wireless AN, or on a service provider's entire network (optionally limited to a state or country—in such optional case, sector ID collisions can occur on the operator's network and still be classified as unique, as utilized herein, so long as the collisions do not occur in the same state or country). A semi-unique sector ID can be any uniquely identify the BS (310A) within a location area or tracking area of the wireless AN, or at least on a particular frequency band employed by the wireless AN.

The sector ID can be included in the preamble of the wireless signal to distinguish the transmitting BS 310A from numerous other BSs (310A, 310B, 310C, 310D). For instance, where thousands of macro, micro, pico, femto and/or like BSs are included in a wireless AN, employing a typical ID for such BSs can result in ID collision for one or more of the BSs (e.g., where the typical ID comprises only dozens or a couple hundred unique instances). As one example, a 64-bit sector ID can be utilized as the sector ID. It should be appreciated, however, that various other bit sizes can be employed within the scope of the subject disclosure. According to some aspects, the mobile device 304 can utilize the sector ID in mobility and communication functions, such as adding a sector to an active set, sending interference management requests, or other functions that can require unique identification of a BS (310A, 310B, 310C, 310D) in a wireless AN.

The sector ID can be incorporated into various portions of the wireless signal preamble. In some aspects, the wireless signal can be sized appropriately to accommodate the sector ID. In other aspects, the sector ID can be modulated in portions of the wireless signal utilized for other preamble information. For instance, the ID can be transmitted in alternating preambles of alternating superframes of the wireless signal. As a particular example, a first superframe and preamble can include control channel information (e.g., F-SBCCH) in a portion (e.g., frame) of the preamble and a second superframe and preamble can replace the control channel information with the sector ID. Accordingly, a mobile device 304 can receive the control channel information and sector ID in alternating superframes of the wireless signal. It should be appreciated that another suitable modulation of control channel or like information and the sector ID can be implemented within the scope of the subject disclosure.

In at least some aspects of the disclosure, the transmission apparatus 302 can further include information identifying blanked portions of the wireless signal in the message preamble. For instance, where a macro BS (310D) blanks an interlace of the wireless signal to reduce or eliminate interference with RA BSs on the interlace, timeline-based functions of the macro BS (310D) can be interrupted if the mobile device 304 expects to obtain information in the blanked interlace. Such timeline-based functions can include Automatic Repeat-reQuest (ARQ) functions, hybrid ARQ (HARQ) functions, and so on. Accordingly, the transmission apparatus 302 can include a schedule of blanked frames, and identify such frames, enabling the mobile device 304 to recognize such frames and respond accordingly.

As described, system 300 provides several improvements to OTA messaging to facilitate wireless communication in a heterogeneous wireless AN. The improvements can lead to efficient interaction with one or more GA or RA BSs. Furthermore, by employing a preamble to transmit information pertinent to BS type, ID and/or scheduling, mobile devices 304 can participate in such communications utilizing relatively little processing (e.g., only processing required to analyze the message preamble). Such a configuration can reduce or minimize power consumption at such devices 304 and extend battery life. Accordingly, significant benefits are achieved by system 300 in a heterogeneous wireless AN.

Figure 4:
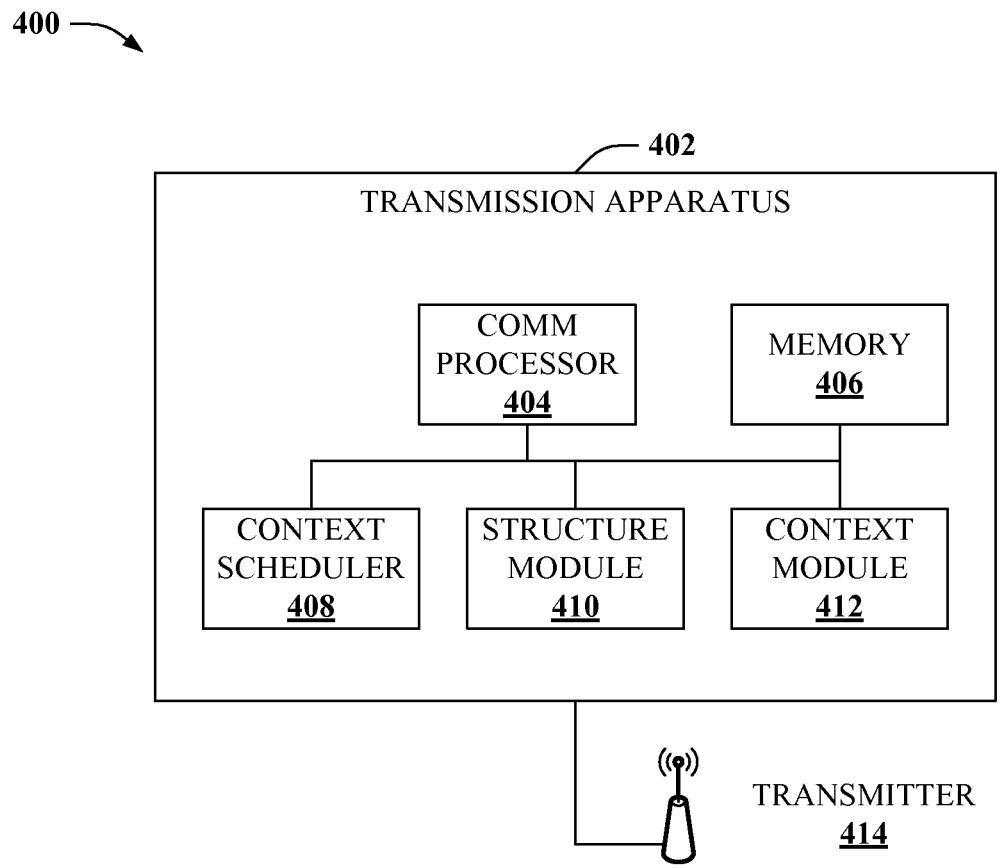
FIG. 4 illustrates a block diagram of an example transmission apparatus for configuring a wireless signal preamble according to additional aspects.

FIG. 4 illustrates a block diagram of an example system 400 comprising a transmission apparatus 402 for configuring a wireless signal preamble according to additional aspects. The transmission apparatus can include information pertinent to a distinct type of a transmitting BS, as described herein. The information can include access type, unique BS identity, scheduling information, and the like. Such information and rules for configuring/transmitting the information can be stored in memory 406

The transmission apparatus can comprise a communication processor 404 that generates a preamble for a wireless signal transmitted by a BS (414) of a wireless AN. In addition, a context module 412 can include the information pertinent to the type of BS in the preamble. According to some aspects, a context scheduler 408 can schedule at least a portion of the preamble into a time or frequency sub-slot of the wireless signal that is (are) designated for a particular type of BS (414). For instance, an interlace reserved for RA and/or low/mid power GA BSs can be employed if the transmitting BS (414) qualifies as such an RA or GA BS. Furthermore, if the transmitting BS does not qualify as such BS type, context scheduler 408 can blank the reserved interlace and schedule the preamble into other portions of the wireless signal.

In some aspects, a message structure module 410 can identify a portion of the wireless signal reserved for transmission by a different type of BS than the transmitting BS. As an example of the foregoing, if the transmitting BS (e.g., macro GA BS) blanks a portion of the wireless signal (e.g., an interlace) reserved for BSs of a different type (e.g., RA or mid/low power GA BSs) message structure module 410 can identify the blanked portion in the preamble of the wireless signal. Accordingly, a mobile device observing the preamble can identify the blanked portion. In some aspects, the reserved portion of the wireless signal can be explicitly identified in a bitmap. In other aspects, the reserved portion can be implicitly identified by indicating a number of time slots and/or frequency sub-bands of the wireless signal comprising the reserved portion. A value of the number can implicitly identify which time slots/frequency sub-bands are included in the reserved portion. According to still other aspects, the message structure module 410 can identify the reserved portion as part of the transmitting BSs control channel information, transmitted in the OTA preamble. In further aspects, the module 410 can replace a subset of the control channel information with the identifying information (e.g., bitmap, number of reserved slots/sub-bands). In at least one other aspect, the module 410 can include the identifying information in a segment of the wireless signal unassociated with control channel information of the BS.

In some aspects of the disclosure, the context module 412 can determine the distinct type of the transmitting BS based at least in part on an access type of such BS. For example, if the BS is a GA or RA BS, the BS type can be determined as GA or RA (e.g., a personal femto BS). Alternatively, or in addition, the distinct type can be determined at least in part on a default transmit power or sector size of the BS. For instance, if the BS serves a micro cell or pico cell, the BS can be determined as a micro or pico type BS. Likewise, where the BS transmits at a default transmit power suitable for a micro or pico BS, the type can be determined as a micro or pico type BS. The type of BS (e.g., macro, micro, pico, femto, GA, RA, etc.) can be indicated utilizing suitable information (e.g., 1-bit number, 3-bit number, and so forth) included in a preamble of a wireless signal.

In addition to the foregoing, system 400 can comprise a wireless transmitter 414 coupled to the transmission apparatus 402. Such transmitter 414 can be utilized at least to send a wireless signal (e.g., broadcast, unicast) to remote devices (e.g., a mobile terminal). The wireless transmitter 414 can comprise a modulator and wireless transceiver of a BS of a wireless AN. The wireless AN can be part of a UMB system, a third generation partnership project (3GPP) long-term evolution (LTE) system, a wideband code division multiple access (W-CDMA) system, or any other suitable mobile communication access system, as described herein, known in the art, or made known to one of skill in the art by way of the context provided herein.

Figure 5:
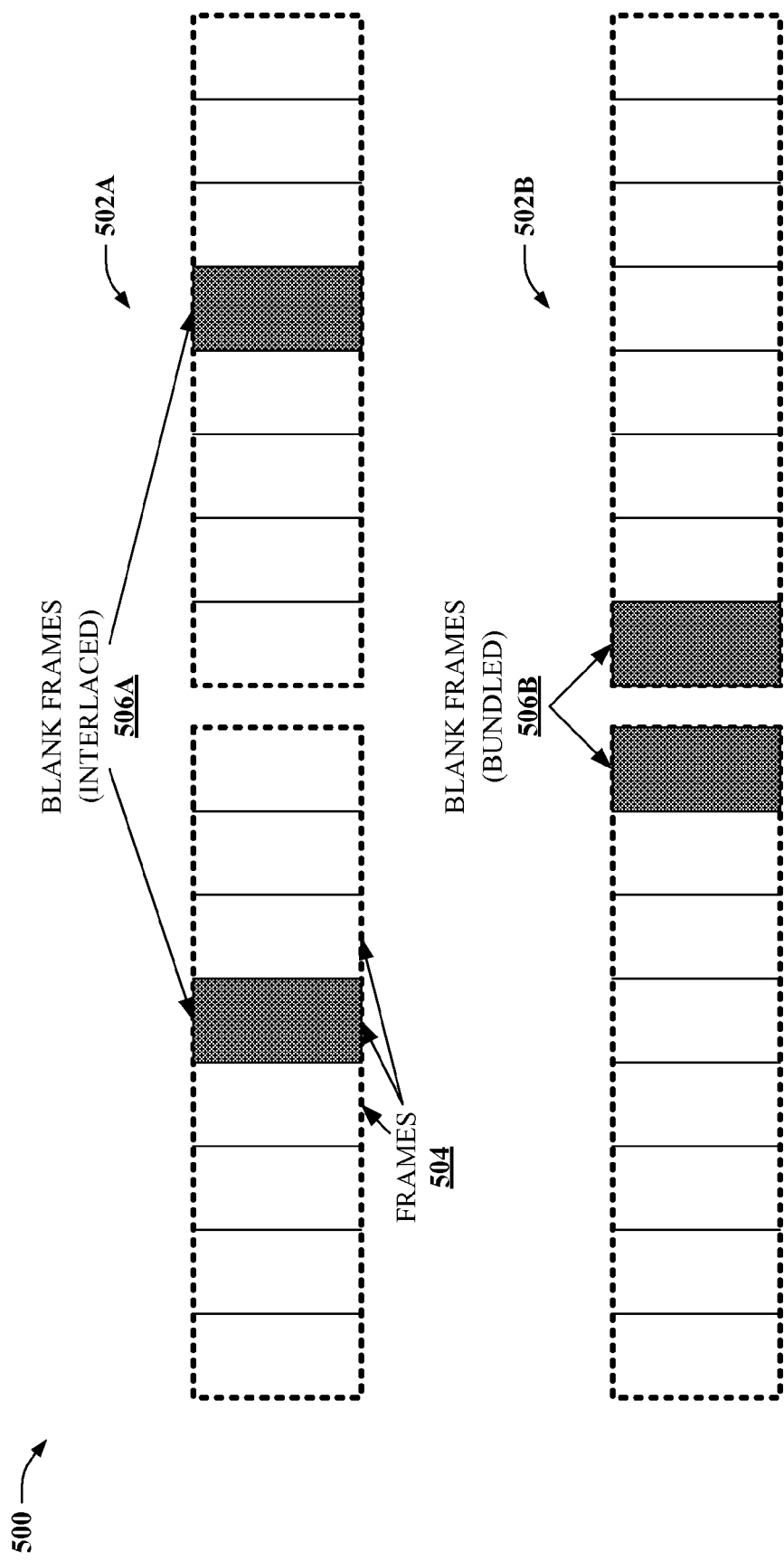
FIG. 5 depicts a block diagram of example wireless signals comprising blanked portions according to some aspects of the disclosure.

FIG. 5 depicts a sample block diagram 500 of example wireless signals 502A, 502B comprising blanked portions (506A, 506B) according to some aspects of the disclosure. The blanked portions (506A, 506B), indicated by shaded regions of the wireless signals 502A, 502B, can facilitate reduced interference in such portions of the wireless signal. For example, a particular type of BS (e.g., macro BS) can schedule no data at such portions (506A, 506B) to reduce interference for low power and/or RA BSs and enable such BSs to utilize the full bandwidth of such portions (506A, 506B) of the messages 502A, 502B. In one aspect, the blanked portions (506A, 506B) can comprise a single interlace (e.g., every eighth frame) of a wireless signal 502A, 502B. As described herein, a BS can advertise which portions (506A, 506B) are blanked.

According to particular aspects of the subject disclosure, blanked portions 506A of a wireless signal 502A can be scheduled with a constant number of data portions (e.g., frames 504) in between. In other aspects, the blanked portions 506B can be bundled at an end of one interlace and beginning of another interlace, as depicted at wireless signal 502B. In the latter case, timeline-based functions (e.g., ARQ, HARQ) can be maintained in consecutive portions of the wireless signal, for instance, prior to and subsequent the bundled blanked portions 506B. In either arrangement, location of blanked frames can be implicitly or explicitly defined in data included in a preamble of the wireless signals 502A, 502B to inform receiving devices of the arrangement. By including such information in the wireless signal preamble, minimal processing power can be expended by the receiving devices in order to obtain such information, facilitating efficient wireless communications.

Figure 6:
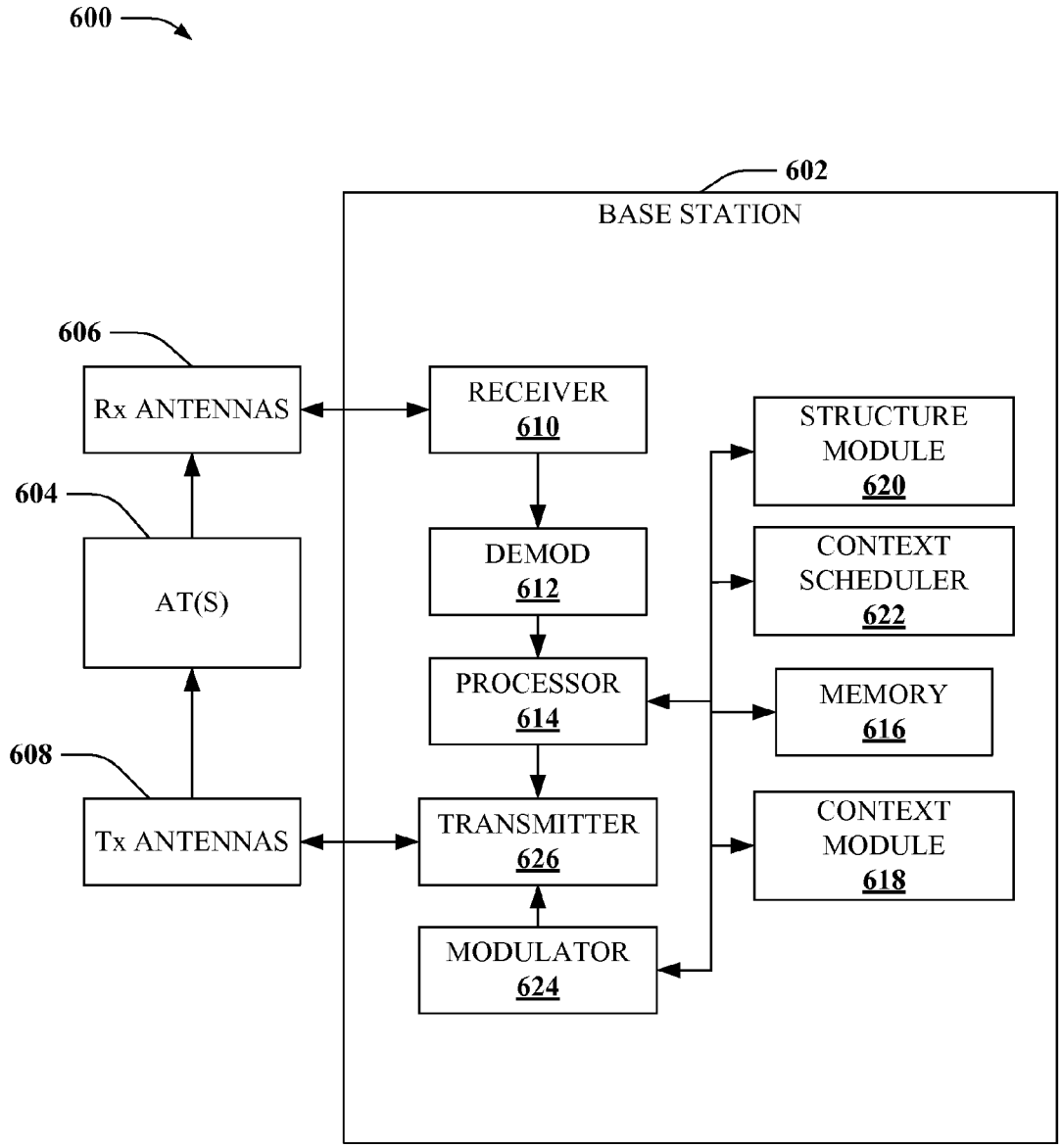
FIG. 6 illustrates a block diagram of an example system comprising a base station configured for a heterogeneous AN according to additional aspects.

FIG. 6 depicts a block diagram of an example system 600 comprising a base station 602 configured for a heterogeneous AN and one or more ATs 604 (e.g., mobile devices) according to aspects of the subject disclosure. Base station 602 can be configured to facilitate efficient communication with the AT(s) 604 in conjunction with other BSs (not depicted) of varying transmit power and/or access configurations. For instance, base station 602 can be configured to schedule preamble information identifying a particular type of the base station 602. The type can include general or restricted access, cell size, unique cell ID, particular scheduling information, or the like.

Base station 602 (e.g., access point, . . . ) can comprise a receiver 610 that receives signal(s), and wireless signals from one or more ATs 604 through one or more receive antennas 606, and a transmitter 626 that transmits coded/modulated wireless signals provided by modulator 624 to the one or more ATs 604 through a transmit antenna(s) 608. Receiver 610 can receive information from receive antennas 606 and can further comprise a signal recipient (not shown) that receives uplink data transmitted by AT(s) 604. Additionally, receiver 610 is operatively associated with a demodulator 612 that demodulates received information. Demodulated symbols are analyzed by a communication processor 614. Communication processor 614 is coupled to a memory 616 that stores information related to functions provided by base station 602. In one instance, stored information can comprise protocols for parsing wireless signals and scheduling forward link (FL) and RL transmissions to one or more time and/of frequency sub-divisions of a signal. Particularly, the stored information can comprise rules for scheduling preamble information into a predetermined portion of a wireless signal, blanking one or more other portions of the wireless signal, identifying a distinct type of BS in the preamble, providing access information, or the like, as described herein.

According to some aspects, communication processor 614 can generate a message preamble for wireless signals comprising at least network overhead information (e.g., synchronization signals, control channel information). In addition, communication processor 614 can be coupled to a context module 618 that can include information pertinent to a distinct type of the BS into the preamble generated by the communication processor 614, as described herein. Such information can include a bit(s) identifying access type (e.g., RA, GA) of the BS and/or transmit power or cell size of the BS (e.g., macro, micro, pico, femto). The information can further comprise a sector ID utilized to identify the base station 602 among a large number of other base stations in a wireless AN, or on a service provider's network. In addition, the information can include scheduling arrangements suitable for successful communication in a heterogeneous wireless AN.

Communication processor 614 can additionally be coupled with a message structure module 620 that identifies portions of a wireless signal transmitted by the base station 602 that are reserved for transmission by different types of BSs, as described herein. Identification can be explicit (e.g., employing a bitmap that identifies a location and/or time slot/frequency sub-band) or implicit (e.g., comprising a number of such portions), and can be included in control channel portions of the wireless signal preamble. Moreover, communication processor 614 can be coupled with a context scheduler 622 that schedules one or more portions of the wireless signal preamble into segments of the message designated for a type of the base station 602. For instance, the preamble can be scheduled to a portion of the message designated for RA BSs if the base station is a RA BS. By including information identifying a type of the base station 602 in the wireless signal preamble, AT(s) 604 can determine whether to access the base station 602, how to obtain and respond to timeline-based functions, and how to identify the base station 602, simply by analyzing the preamble. Accordingly, such information originated from large numbers of such base stations 602 in a heterogeneous wireless AN can be analyzed with minimal processing power at the AT(s) 604.

Figure 7:
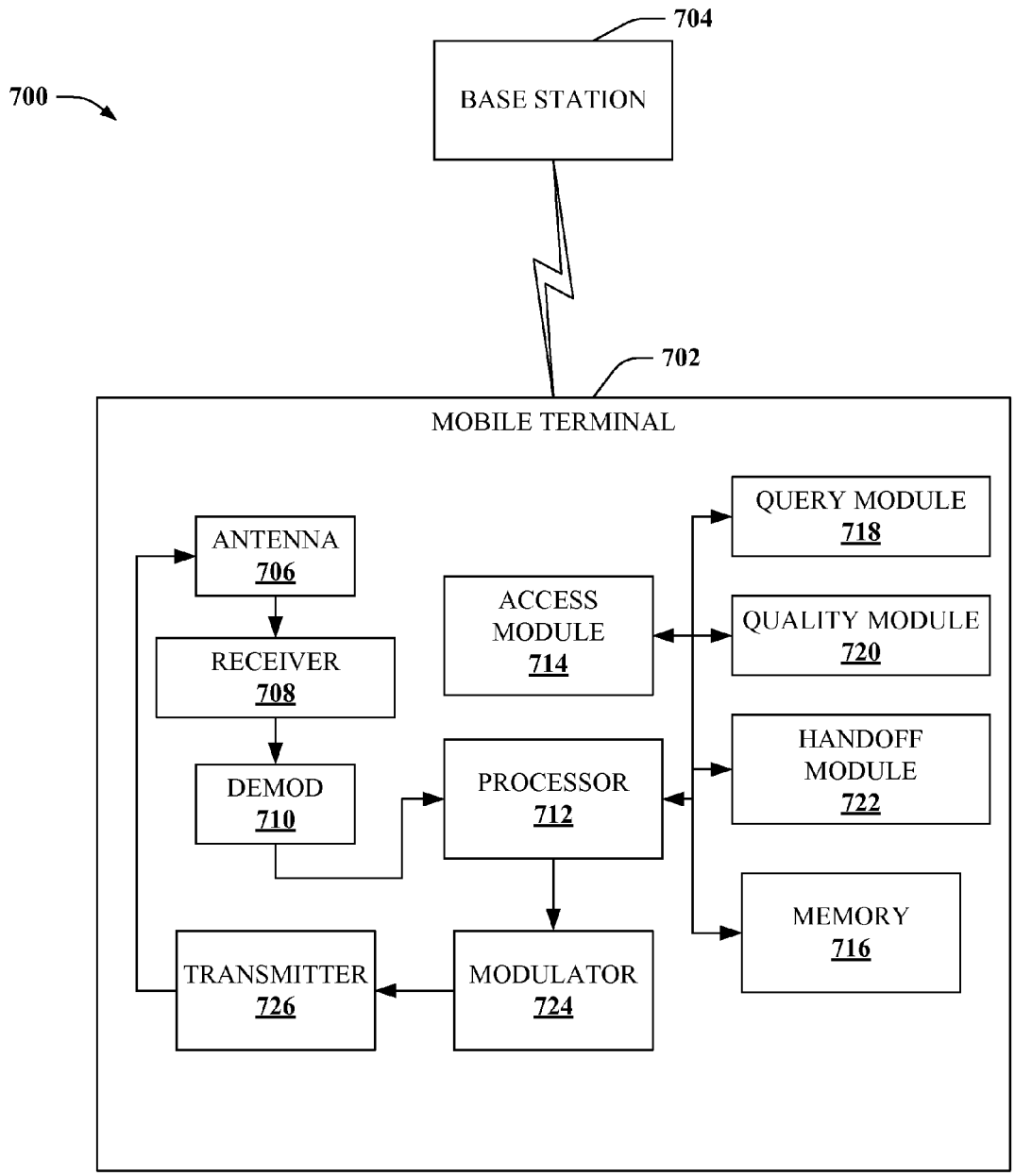
FIG. 7 depicts a block diagram of an example system comprising a mobile terminal configured to facilitate improved communication in a heterogeneous AN.

FIG. 7 depicts a block diagram of an example system 700 comprising a mobile terminal 702 configured to facilitate improved communication in a heterogeneous AN. Mobile terminal 702 can be configured to wirelessly couple with one or more base stations 704 (e.g., access point) of a wireless AN. Mobile terminal 702 can receive wireless signals from the base station 704 on a FL channel and respond with wireless signals on a RL channel, as known in the art. In addition, mobile terminal 702 can obtain preamble information transmitted by the base station 704 by scanning selected portions of a wireless signal, based on a type (e.g., transmission power, GA, RA) of the base station 704. In addition, mobile terminal 702 can extract information identifying a distinct type of the base station 704 from the preamble. In some aspects, mobile terminal 702 can utilize the information to obtain an access status of the mobile terminal 702 with respect to the base station 704.

Mobile terminal 702 includes at least one antenna 706 (e.g., a transmission receiver or group of such receivers comprising an input interface) that receives a signal (e.g., an over-the-air [OTA] transmission) and receiver(s) 708, which performs typical actions (e.g., filters, amplifies, down-converts, etc.) on the received signal. In general, antenna 706 and transmitter 726 (collectively referred to as a transceiver) can be configured to facilitate wireless data exchange with base station(s) 704. According to at least some aspects, a data processor(s) 712 can scan one or more portions of a received message for a message preamble. The data processor(s) 712 can extract information from the preamble to identify a distinct type of the BS 704.

Antenna 706 and receiver(s) 708 can also be coupled with the demodulator 710 that can demodulate received symbols and provide them to data processor(s) 712 for evaluation. It should be appreciated that data processor(s) 712 can control and/or reference one or more components (706, 708, 710, 714, 716, 718, 720, 722, 724, 726) of the mobile terminal 702. Further, data processor(s) 712 can execute one or more modules, applications, engines, or the like (714, 718, 720, 722) that comprise information or controls pertinent to executing functions of the mobile terminal 702. For instance, such functions can include scanning received wireless signals for a type of the base station 704, identity of the base station 704, and/or channel scheduling of the base station 704. In addition, functions can include accessing a base station 704, including the base station 704 in an active set, querying the base station 704 for an access status, or like operations, as described herein.

Mobile terminal 702 can additionally include memory 716 that is operatively coupled to data processor(s) 712. Memory 716 can store data to be transmitted, received, and the like, and instructions suitable to conduct wireless communication with a remote device (704). Further, memory 716 can store the modules, applications, engines, etc. (714, 718, 720, 722) executed by processor(s) 712, above. According to some aspects, antenna(s) 706 can obtain a wireless signal from a sector (704) of a wireless AN. Data processor(s) 712 can scan portion of the wireless signal to obtain a message preamble and type identifying information of the base station 704. For instance, the data processor(s) 712 can determine whether base station 704 is a RA BS, GA BS, or limited access (LA) BS, at least in part from the type identifying information. In the latter case, where the base station 704 is determined to be restricted, a query module 718 can employ a unicast message to obtain an access statue of mobile terminal 702 from the base station 704. The status can comprise information indicating whether the mobile terminal 704 is included within a CAG. Alternatively, or in addition, a response to the unicast message can comprise the CAG. In such case, data processor(s) 712 can determine whether mobile terminal 702 is included within the CAG of the base station 704. An access module 714 can activate the base station 704 based at least in part on the distinct type of the base station 704 (e.g., if mobile terminal 702 is included within the CAG).

According to additional aspects, data processor(s) 712 can extract a sector ID from the preamble of the wireless signal. The sector ID can uniquely identify the base station 704 in a particular tracking area or location area of a service provider's network, or on a particular frequency band employed by such network (e.g., a semi-unique sector ID, as defined herein), or can uniquely identify base station 704 among all other such base stations on a service provider's network in general (e.g., a unique ID, as defined herein). Additionally, a communication quality module 720 can submit the sector ID in conjunction with a request to reduce interference. For example, if signals from base station 704 are causing interference for mobile terminal 702, the sector ID can be submitted in conjunction with a resource utilization message (RUM) requesting reduction of transmit power on one or more channel resources utilized by the mobile terminal 702. In other aspects, a handoff module 722 can add the sector ID to an active set of BSs managed by the mobile terminal 702. Furthermore, the sector ID can be also utilized in implementing a handoff determination (e.g., to or from the base station 704).

According to one or more further aspects, data processor(s) 712 can scan alternating preambles of the wireless signal to obtain different information. For instance, where the information identifying the type of base station 704 is modulated with other information (e.g., control channel information), the identifying information can be monitored in, for instance, odd numbered preambles, and other information can be acquired in even numbered preambles. In at least one aspect, scheduling information pertaining to a heterogeneous wireless AN can be extracted from the preamble(s) of the wireless signal. For instance, information identifying blanked segments of the wireless signal can be identified. In one aspect, demodulator 710 can decode a bitmap identifying these blanked segments. In other aspects, data processor(s) 712 can implicitly determine the blanked segments from a specified number of such segments, by reference to a lookup table mapping the number to particular segments of the wireless signal, for example. By identifying blanked segments, timeline-based functions can be analyzed with respect to other segments of the wireless signal, such as those segments preceding and/or following the blanked segments.

The aforementioned systems have been described with respect to interaction between several components, modules and/or communication interfaces. It should be appreciated that such systems and components/modules/interfaces can include those components or sub-components specified therein, some of the specified components or sub-components, and/or additional components. For example, a system could include transmission apparatus 402, transmitter 414, and mobile device 304, or a different combination of these and other components. Sub-components could also be implemented as components communicatively coupled to other components rather than included within parent components. Additionally, it should be noted that one or more components could be combined into a single component providing aggregate functionality. For instance, communication processor 306 can include context module 308, or vice versa, to facilitate generating a preamble and including information identifying BS type into the preamble by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 8-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 8:
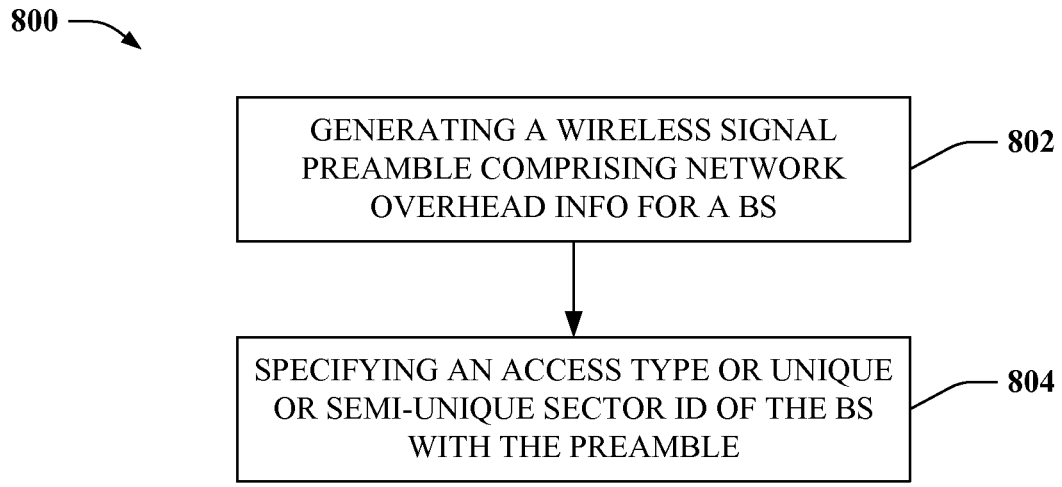
FIGS. 8 and 8A illustrate flowcharts of examples methodologies for providing improved wireless communication in heterogeneous AP networks.
Figure 8A:
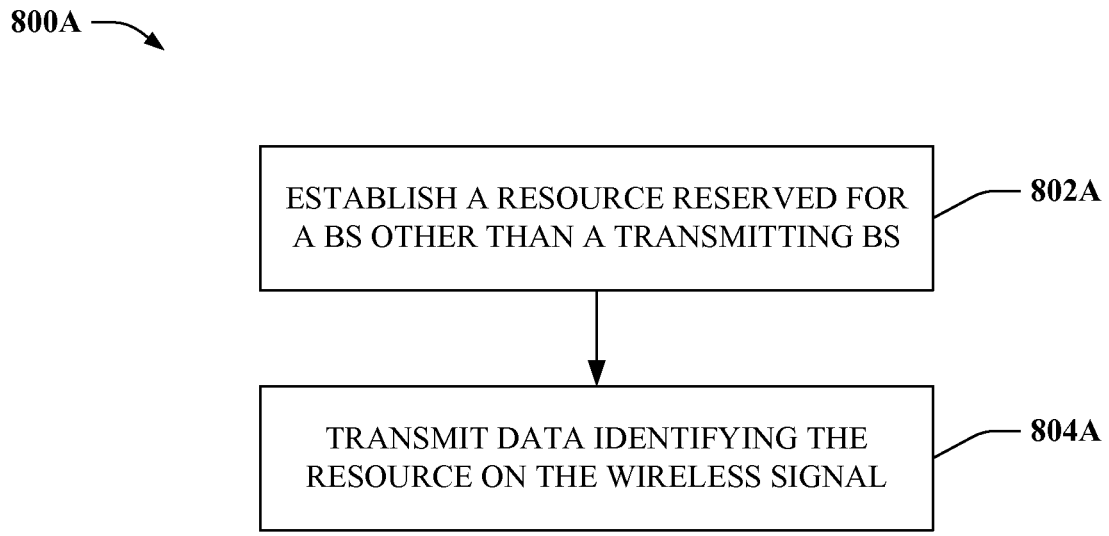

FIGS. 8 and 8A illustrate flowcharts of example methodologies 800,800A for providing improved wireless communication in heterogeneous AP networks. Method 800, at 802, can generate a preamble for an OTA communication message, where such preamble contains at least network overhead information. Additionally, at 804, method 800 can include information pertinent to a distinct type of a transmitting BS into the preamble. The information can include an access type of the BS, a sector ID of the BS, scheduling information of the BS, or the like, as described herein. In some aspects, the access type can indicate a GA or RA type of BS, or sector size/transmit power of the BS. In particular aspects, the access type can further include a CAG of the BS, enabling receiving devices to identify whether they are authorized to access the BS. Accordingly, information utilized to facilitate communication in a heterogeneous wireless AN, or reduce interference in such AN, can be obtained by monitoring the preamble of the wireless signal, minimizing processing power of terminals communication with APs of the wireless AN.

Method 800A, at 802A, can establish a set of wireless signal resources reserved for BSs other than a BS transmitting the wireless signal. Such resources can include suitable time, frequency, code, signal or like resources, or a combination thereof. Furthermore, the reserved resources can be full re-use resources (e.g., where a single set of data is transmitted on the established resource) or fractional re-use resources (e.g., employing subsets of an established resource for communicating a set of data, rather than all of a particular resource, enabling multiple BSs to transmit data on the established resource, for instance). According to some aspects, the transmitting BS can be configured to transmit with reduced power on the reserved set of resources, or blank such resources (e.g., transmit with no power).

At 804A, method 800A can transmit data identifying the set of reserved resources on the wireless signal. Accordingly, terminals receiving the signal can identify resources that the transmitting BS will blank, or will transmit with reduced power on. The terminals can utilize the reserved resources when served by a BS other than the transmitting BS (or, e.g., a BS of a different access type, transmit power type, re-use type, or other suitable BS type, from the transmitting BS) for interference management or mobility management. As an example, a terminal could inform a serving BS of the blanked resources. The serving BS can then schedule high QoS data on the reserved resources for reduced interference from the transmitting BS. Additionally, the serving BS can lower transmit power on such resources as a result of the reduced interference, reducing interference caused by the serving BS to other nearby terminals.

Figure 9:
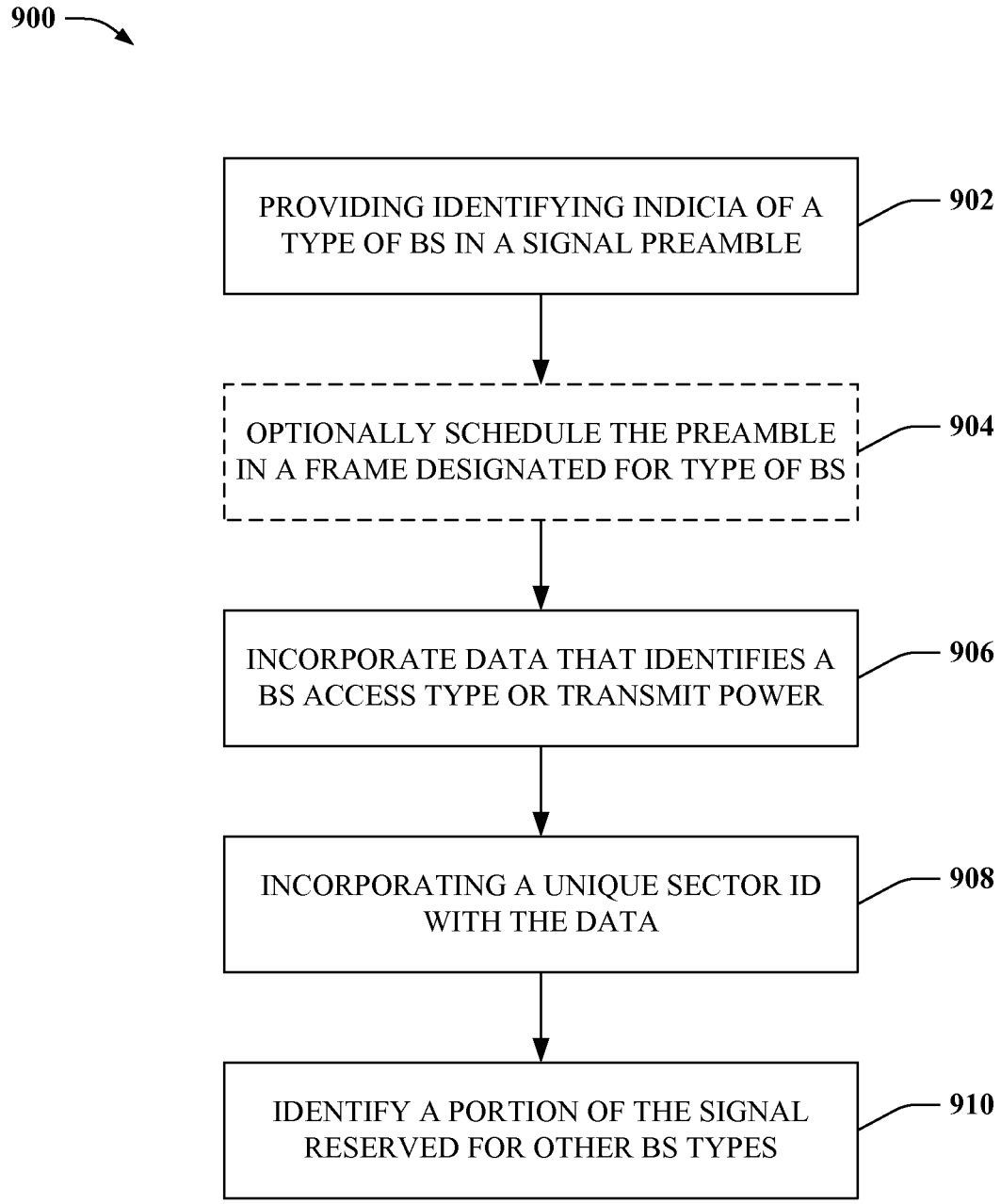
FIG. 9 depicts a flowchart of a sample methodology for providing improved mobility or interference management in wireless communications.

FIG. 9 depicts a flowchart of a sample methodology 900 for providing BS type information in message preamble to improve reliability in wireless communications. At 902, method 900 can provide indicia identifying a type of a transmitting BS into a preamble of a wireless signal. At 904, method 900 can optionally schedule at least a portion of the preamble in a frame of the wireless signal specifically designated for the type of the transmitting BS. For instance, the preamble or portion thereof can be scheduled into a frame or frames designated for RA BSs, GA BSs, low/mid power BSs, or the like. Such an arrangement can significantly reduce interference for remote devices at least on the designated portion(s) of the wireless signal.

At 906, method 900 can incorporate data into the preamble that identifies a BS access type, transmit power type or re-use type. For instance, the data can indicate whether the BS is a RA or GA BS. Alternatively, or in addition, the data can indicate whether the BS is a macro, micro, pico, or femto BS, or whether the BS employs full re-use or fractional re-use. In additional aspects, the data can further comprise information indicating what devices are eligible to access the BS, reducing signaling required by a mobile terminal in determining access authorization.

At 908, method 900 can incorporate unique or semi-unique sector ID information (as defined herein) in the preamble data. The sector ID can be scheduled in a particular portion of the preamble designated for such information, can be modulated with other information (e.g., control channel information) in one or more preambles of the wireless signal, or the like, as described herein. The sector ID data can facilitate mobility determinations (e.g., handoff, active set management, etc.) and/or interference reduction (e.g., RUM messages) in a heterogeneous wireless AN, comprising few or many APs.

At 910, method 900 can identify a portion of the wireless signal reserved for BSs of a type different than the transmitting BS. For instance, the preamble can indicate certain portions of the wireless signal that are blanked by the transmitting BS. Such indication can be contained in a bitmap explicitly identifying such portion(s) of the wireless signal, or one or more bits indicating a number of such portions, as described herein. As described, method 900 can facilitate efficient wireless communication in heterogeneous networks, by including the type information in the preamble message typically monitored by nearby mobile devices.

Figure 10:
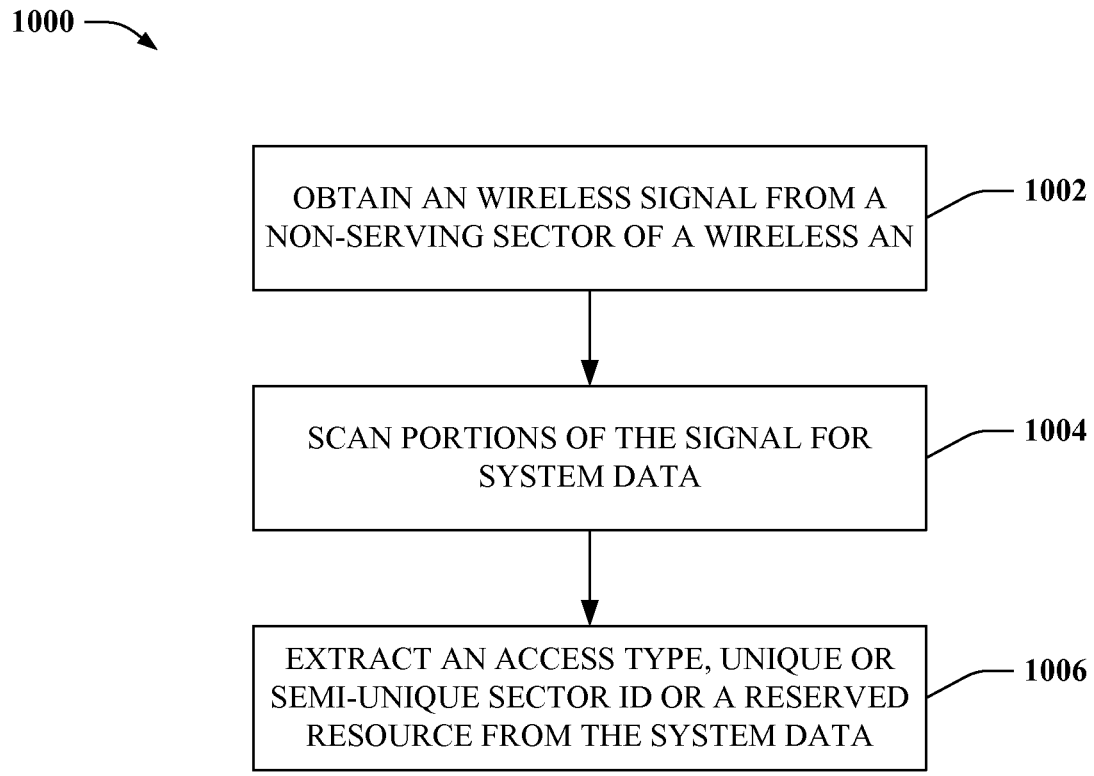
FIG. 10 illustrates a flowchart of a sample methodology for accessing BS information from a wireless signal according to some aspects disclosed herein.

FIG. 10 illustrates a flowchart of a sample methodology 1000 for accessing BS type information in a wireless signal according to some aspects disclosed herein. At 1002, method 1000 can obtain a wireless signal from a sector of a wireless AN. At 1004, method 1000 can scan one or more portions of the wireless signal for system data. At 1006, method 1000 can extract information from the system data that identifies an access type, unique or semi-unique sector ID, or reserved signal resources pertinent to a BS that originates the wireless signal. The access type can be utilized to determine whether access to the BS is permitted, prior to signaling the BS for such access. Furthermore, the distinct type information can be utilized to identify the BS in a wireless AN, for mobility and/or interference management purposes, for instance. Additionally, information extracted from the system data can be utilized to infer scheduling protocols, such as blanked portions of the wireless signal or portions transmitted at reduced power. Such scheduling protocols can be employed in managing mobility, interference avoidance, or in some aspects, timeline-based functions of the wireless AN (e.g., HARQ functions), as described herein.

Figure 11:
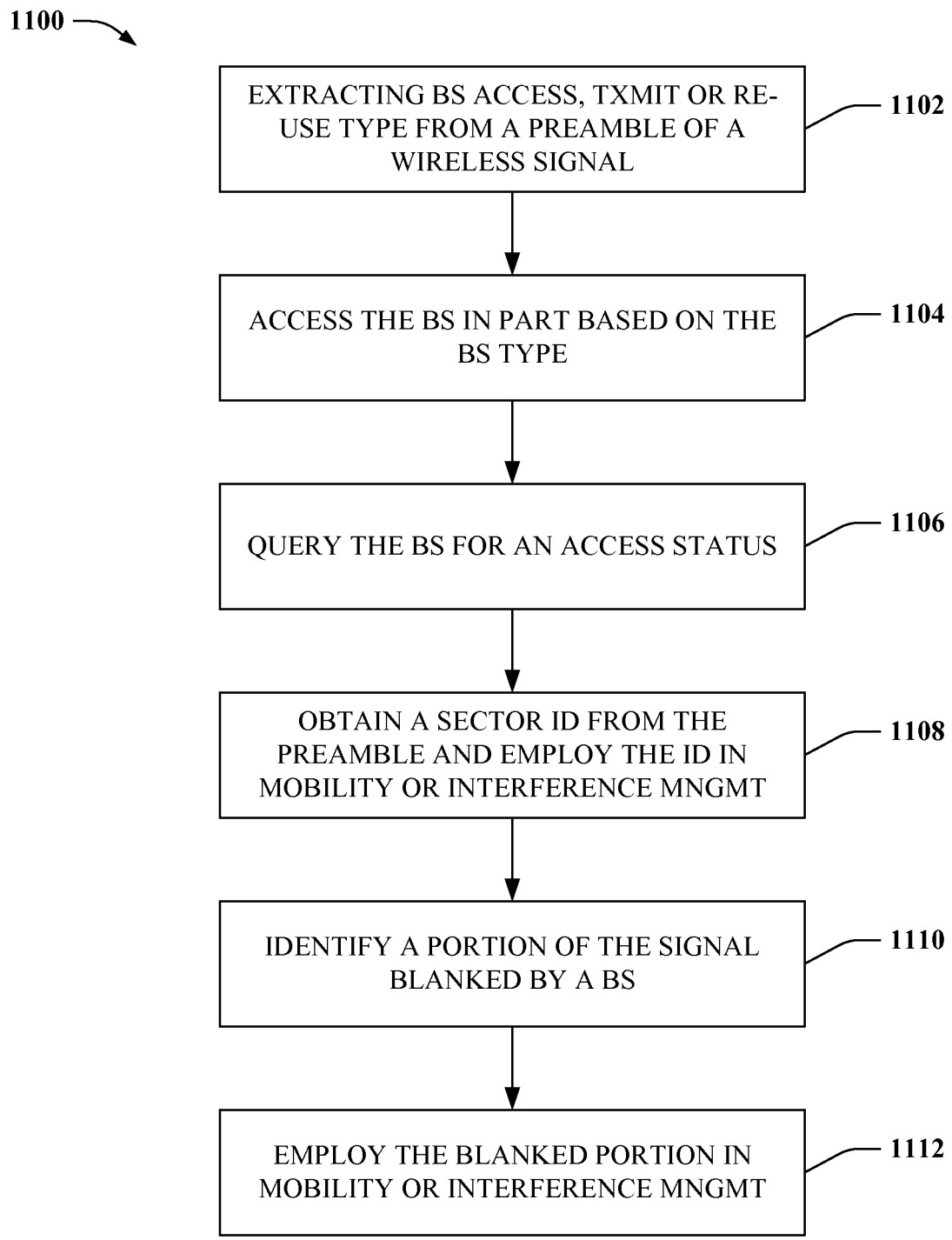
FIG. 11 depicts a flowchart of an example methodology for implementing improved mobility or interference management according to further aspects.

FIG. 11 depicts a flowchart of an example methodology 1100 for accessing and utilizing BS type information in a wireless signal according to further aspects. At 1102, method 1100 can extract BS type information from a preamble of a received wireless signal. At 1104, method 1100 can access the BS in part based on the BS type information. For instance, where the type information indicates the BS is a GA BS, authorization to access to the BS can be inferred. Where the type information indicates the BS is a RA BS, authorization to access can be determined at a receiving device, or additional signaling with the BS can be conducted to determine such authorization.

At 1106, method 1100 can query the BS for an access status. A result of the query can indicate authorization status, or degree of authorization. For instance, degree can indicate no authorization, full authorization, or limited authorization. In the latter case, authorization can be limited to a particular type of communication (e.g., voice only), particular data rate, particular application usage, particular network access, and/or the like.

At 1108, method 1100 can obtain a unique or semi-unique sector ID from the preamble. The sector ID can be utilized in mobility management and/or interference management, as described herein. At 1110, method 1100 can identify a portion of the wireless signal blanked by a transmitting BS. Blanked portions can be utilized to monitor other BSs with reduced interference, for instance. In other aspects, the blanked portions can be identified and managed in conjunction with timeline-based functions of the BS.

At 1112, method 1100 can employ the blanked portion in mobility or interference management. For instance, terminals can handoff to a serving BS employing resources that are blanked or transmitted at reduced power by the BS, due to the lower interference on those resources. As another example, a terminal can report the blanked portion to a current serving BS in conjunction with interference management (e.g., to switch to the blanked resources). As described, method 1100 can facilitate efficient communication with wireless APs by identifying a type of AP from a message preamble and interacting, or refraining to interact, with the AP in a manner suited to the type.

Figure 12:
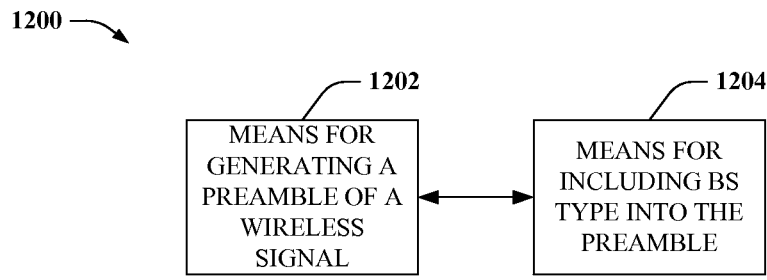
FIGS. 12 and 12A illustrate block diagrams of example systems that provide wireless sector information for improved wireless communications.
Figure 12A:
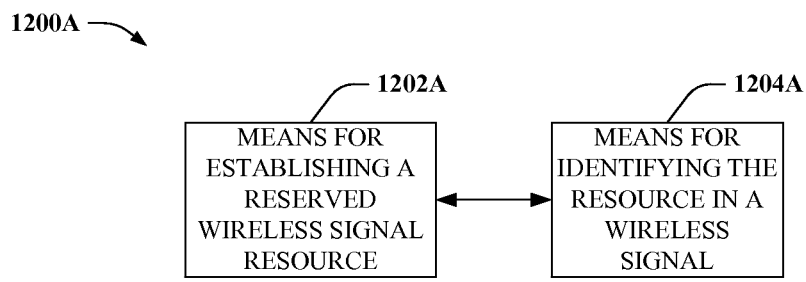

FIGS. 12 and 12A illustrate block diagrams of example systems 1200, 1200A that provide improved wireless communications according to some aspects of the subject disclosure. System 1200 can comprise a means 1202 for generating a preamble of a wireless signal. In addition, system 1200 can comprise a means 1204 for including BS type information into the preamble. The type information can comprise an access type of the BS, as well as information identifying devices authorized to access the BS. Further, the information can comprise ID information uniquely identifying the BS among large numbers of other BSs in a wireless AN, or multiple wireless ANs, or other BSs of a provider's network. Moreover, the information can comprise scheduling information utilized in type-specific communications designed to reduce interference in a wireless AN for various type BSs (e.g., RA and GA BSs, high power and low power BSs, and so on).

System 1200A can comprise a means 1202A for establishing a set of resources of a wireless signal that are reserved for a BS other than a BS transmitting the wireless signal. Alternatively, the resources can be reserved for a type of BS different than a type of the transmitting BS (e.g., a different transmit power type, access type, re-use type). According to some aspects, the transmitting BS, or BSs having a common transmit power, re-use or access type, can be configured to blank or transmit at reduced power on the reserved resources. In addition to the foregoing, system 1200A can comprise a means 1204A for including data within the wireless signal that identifies the reserved resources. The data can be included in system data that is generally accessible to terminals in range of the transmitting BS. In some aspects, the data can be included in a preamble of the wireless signal, optionally a re-use preamble.

Figure 13:
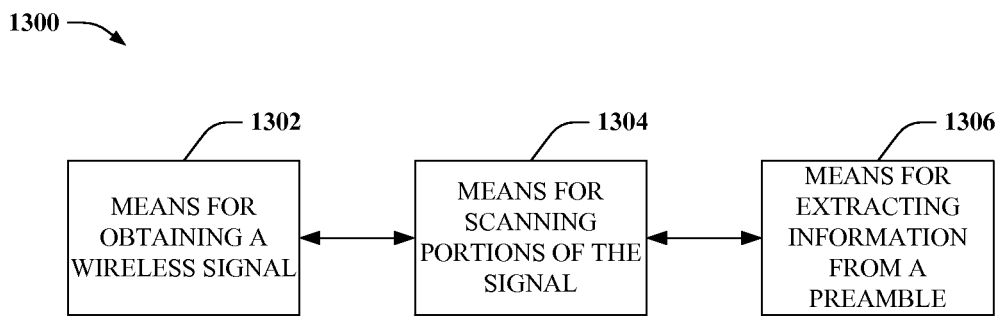
FIG. 13 illustrates a block diagram of a sample system that employs BS access type or ID information to improve wireless data exchange.

FIG. 13 illustrates a block diagram of a sample system 1300 that accesses and utilizes BS type information in preamble messaging to improve wireless data exchange. System 1300 can comprise a means 1302 for obtaining a wireless signal. Such means 1302 can comprise a wireless antenna, receiver, demodulator, processor(s), memory, and/or like components suitable for receiving and interpreting the wireless signal in a wireless communication environment. Furthermore, system 1300 can comprise a means 1304 for scanning portions of the wireless signal. The means 1304 can comprise instructions for identifying a preamble of the wireless signal from the scanned portions. Furthermore, system 1300 can additionally comprise a means 1306 for extracting information from the preamble of the wireless signal. In some aspects, the means 1306 can be configured to selectively extract information identifying a type of BS transmitting the wireless signal. In other aspects, the means 1306 can be configured to selectively extract a unique or semi-unique sector ID (as defined herein) of the transmitting BS from the preamble. According to further aspects, the means 1306 can be configured to selectively extract scheduling information pertaining to blanked portions of the wireless signal, or portions designated for a BS of a particular type, or the like. In one or more other aspects, the means 1306 can be configured to extract a combination of the foregoing information.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method of wireless communication in a heterogeneous wireless access network that includes multiple instances of a macro base station (BS) whose access by mobile terminals is unrestricted, and at least one instance of a BS other than a macro BS, comprising:
    generating a preamble for a wireless signal, the preamble comprises network overhead information pertinent to a BS transmitting the wireless signal;
    including information within at least one of a control channel and an acquisition pilot within the preamble that identifies an access type of the BS as unrestricted if the BS is a macro BS, and otherwise identifies the access type as restricted; and
    transmitting the preamble as a low re-use preamble, wherein the information within the preamble further includes information that specifies that the BS is a low re-use type BS, wherein low re-use refers to use of only a portion of resources that are available for transmitting the wireless signal during a given time frame, wherein the available resources are shared by the BSs in the wireless access network, and wherein the available resources are selected from the group consisting of time, frequency, code and symbol-based resources.

2. The method of claim 1, further comprising scheduling at least a portion of the preamble into a resource of the wireless signal designated for the access type of BS.

3. The method of claim 1, including information within the preamble that identifies the access type of BS further comprises
    specifying within the preamble a transmit power type of the BS.

4. The method of claim 1, further comprising indicating a limited access to services of the BS based at least in part on the access type of the BS.

5. The method of claim 4, further comprising including the indication of limited access in a separate control channel from the information identifying the access type of BS.

6. The method of claim 4, further comprising including the indication of limited access in a unicast message to a terminal having limited access to the BS.

7. The method of claim 1, further comprising including in the preamble at least one of: a unique or semi-unique sector ID that is distinct at least within a tracking area, routing area or frequency band of an operator's wireless network; or
    a set of wireless signal resources blanked or transmitted at reduced power by the BS.

8. The method of claim 7, further comprising employing the sector ID to contact an interfering sector via a backhaul network to facilitate interference management with the interfering sector.

9. The method of claim 7, further comprising:
    employing the sector ID in determining relative signal strength or signal quality of a BS neighboring the transmitting BS; and
    employing the relative signal strength or signal quality in a handoff determination.

10. The method of claim 1, further comprising transmitting the wireless signal to facilitate wireless communication between remote devices in at least one of:
    an ultra mobile broadband (UMB) wireless access network (AN);
    a third generation partnership project long term evolution (3 GPP-LTE) wireless AN;
    a wireless interoperability for microwave access (WiMAX) wireless AN; or
    a wideband code division multiple access (W-CDMA) wireless AN.

11. The method of claim 1, wherein the access type identified by the information within the preamble specifies a transmit power type of the BS.

12. The method of claim 11, wherein the specified transmit power type of the BS corresponds to an indication that the BS is one of a macro BS, a micro BS, a pico BS or a femto BS.

13. The method of claim 1, wherein the low re-use preamble is transmitted by deliberately blanking or reducing power upon a portion of the transmission resources that are reserved by the BS for the transmission of the low re-use preamble by the BS in order to accommodate at least one transmission by at least one other BS on the at least one other BS's corresponding transmission resources.

14. An apparatus that facilitates wireless communication in a heterogeneous wireless access network that includes multiple instances of a macro base station (BS) whose access by mobile terminals is unrestricted, and at least one instance of a BS other than a macro BS, comprising:
    a communication processor that generates a preamble for a wireless signal, the preamble comprises network overhead information pertinent to a BS transmitting the wireless signal;
    a context module that includes information within at least one of a control channel and an acquisition pilot within the preamble that identifies an access type of the BS as unrestricted if the BS is a macro BS, and otherwise identifies the access type as restricted, and transmits the preamble as a low re-use preamble, wherein the information within the preamble further includes information that specifies that the BS is a low re-use type BS, wherein low re-use refers to use of only a portion of resources that are available for transmitting the wireless signal during a given time frame, wherein the available resources are shared by the BSs in the wireless access network, and wherein the available resources are selected from the group consisting of time, frequency, code and symbol-based resources; and
    memory coupled to the communication processor.

15. The apparatus of claim 14, further comprising a context scheduler that schedules at least a portion of the preamble into a resource of the wireless signal designated for the access type of the BS.

16. The apparatus of claim 14, the included information further includes an indication of limited access to services of the BS, the limited access is based at least in part on the access type of the BS.

17. The apparatus of claim 16, the context module incorporates the indication of limited access in a separate control channel from the information identifying the access type of the BS.

18. The apparatus of claim 16, the context module includes the indication of limited access in a unicast message to a terminal having limited access to the BS.

19. The apparatus of claim 14, further comprising a message structure module that at least one of:
    specifies a unique or semi-unique sector ID of the BS within the preamble, the sector ID is unique at least for sectors sharing a tracking area, routing area or frequency band of a wireless network; or
    specifies a set of wireless signal resources blanked or transmitted at reduced power by the BS.

20. The apparatus of claim 19, wherein the communication processor employs the sector ID to contact an interfering sector via a backhaul network to facilitate interference management with the interfering sector.

21. The apparatus of claim 14, wherein the communication processor:
  employs the sector ID in determining relative signal strength or signal quality of a BS neighboring the transmitting BS; and
  employs the relative signal strength or signal quality in a handoff determination.

22. The apparatus of claim 14, further comprising a wireless transmitter that sends the wireless signal to facilitate wireless communication between remote devices in at least one of:
  a UMB wireless AN;
  a 3 GPP-LTE wireless AN;
  a WiMAX wireless AN; or
  a W-CDMA wireless AN.

23. An apparatus for wireless communication in a heterogeneous wireless access network that includes multiple instances of a macro base station (BS) whose access by mobile terminals is unrestricted, and at least one instance of a BS other than a macro BS, comprising:
  means for generating a preamble for a wireless signal, the preamble comprises network overhead information pertinent to a BS transmitting the wireless signal, wherein the means for generating includes information within at least one of a control channel and an acquisition pilot within the preamble that identifies an access type of the BS as unrestricted if the BS is a macro BS, and otherwise identifies the access type as restricted, wherein the information within the preamble further includes information that specifies that the BS is a low re-use type BS, wherein low re-use refers to use of only a portion of resources that are available for transmitting the wireless signal during a given time frame, wherein the available resources are shared by the BSs in the wireless access network, and wherein the available resources are selected from the group consisting of time, frequency, code and symbol-based resources; and
  means for transmitting the preamble as a low re-use preamble.

24. At least one processor configured for wireless communication in a heterogeneous wireless access network that includes multiple instances of a macro base station (BS) whose access by mobile terminals is unrestricted, and at least one instance of a BS other than a macro BS, comprising:
  a first module configured to generate a preamble for a wireless signal, the preamble comprises network overhead information pertinent to a BS transmitting the wireless signal;
  a second module configured to include information within at least one of a control channel and a pilot within the preamble that identifies an access type of the BS as unrestricted if the BS is a macro BS, and otherwise identifies the access type as restricted; and
  a third module configured to transmit the preamble as a low re-use preamble, wherein the information within the preamble further includes information that specifies that the BS is a low re-use type BS, wherein low re-use refers to use of only a portion of resources that are available for transmitting the wireless signal during a given time frame, wherein the available resources are shared by the BSs in the wireless access network, and wherein the available resources are selected from the group consisting of time, frequency, code and symbol-based resources.

25. A non-transitory computer-readable medium containing instructions stored thereon, which, when executed by an apparatus, cause the apparatus to perform operations for wireless communication in a heterogeneous wireless access network that includes multiple instances of a macro base station (BS) whose access by mobile terminals is unrestricted, and at least one instance of a BS other than a macro BS, the instructions comprising:
  a first set of codes for causing a computer to generate a preamble for a wireless signal, the preamble comprises network overhead information pertinent to a BS transmitting the wireless signal;
  a second set of codes for causing the computer to include information within at least one of a control channel and an acquisition pilot within the preamble that identifies an access type of the BS as unrestricted if the BS is a macro BS, and otherwise identifies the access type as restricted; and
  a third set of codes for causing the computer to transmit the preamble as a low re-use preamble, wherein the information within the preamble further includes information that specifies that the BS is a low re-use type BS, wherein low re-use refers to use of only a portion of resources that are available for transmitting the wireless signal during a given time frame, wherein the available resources are shared by the BSs in the wireless access network, and wherein the available resources are selected from the group consisting of time, frequency, code and symbol-based resources.

26. A method of facilitating wireless communication in a heterogeneous wireless access network that includes multiple instances of a macro base station (BS) whose access by mobile terminals is unrestricted, and at least one instance of a BS other than a macro BS, comprising:
  obtaining a wireless signal from a non-serving sector of the wireless access network;
  scanning one or more portions of the wireless signal for system data; and
  extracting, based on the scanning, information within at least one of a control channel and an acquisition pilot within a low re-use preamble from the system data that identifies an access type of a BS associated with the non-serving sector as unrestricted if the BS is a macro BS, and otherwise identifies the access type as restricted, wherein the information within the preamble further includes information that specifies that the BS is a low re-use type BS, wherein low re-use refers to use of only a portion of resources that are available for transmitting the wireless signal during a given time frame, wherein the available resources are shared by the BSs in the wireless access network, and wherein the available resources are selected from the group consisting of time, frequency, code and symbol-based resources.

27. The method of claim 26, further comprising at least one of:
  determining the access type; or
  determining a re-use type of the BS from the wireless signal.

28. The method of claim 26, further comprising determining whether the non-serving sector employs restricted association by analyzing a restricted association bit of the system data.

29. The method of claim 28, further comprising determining an ID of the non-serving sector, and comparing the ID to a list of RA BSs authorized for use by a terminal.

30. The method of claim 29, further comprising accessing or refraining from accessing the non-serving sector based at least in part on the comparison.

31. The method of claim 26, extracting the information further comprises obtaining a reference within the system data to a pilot or control channel carrying the information.

32. The method of claim 26, further comprising analyzing the system data to obtain a unique or semi-unique sector ID for the non-serving sector.

33. The method of claim 26, further comprising transmitting a message to the non-serving sector requesting an access authorization status.

34. The method of claim 33, further comprising receiving a response to the request indicating the access authorization status.

35. The method of claim 34, the response is received on a broadcast control channel reserved for access authorization responses or received via unicast messaging.

36. The method of claim 26, further comprising obtaining the system data and information from the preamble of the wireless signal.

37. The method of claim 26, further comprising at least one of:
   obtaining from the system data a set of wireless signal resources blanked or transmitted at reduced power by the sector; or
   identifying the non-serving sector at least in part as a result of such sector transmitting the system data on the low re-use preamble.

38. An apparatus that facilitates wireless communication in a heterogeneous wireless access network that includes multiple instances of a macro base station (BS) whose access by mobile terminals is unrestricted, and at least one instance of a BS other than a macro BS, comprising:
   a receiver that obtains a wireless signal from a non-serving sector of the wireless access network;
   a data processor that scans one or more portions of the wireless signal for system data and extracts, based on the scanning, information within at least one of a control channel and an acquisition pilot within a low re-use preamble from the system data that identifies an access type of a BS associated with the non-serving sector as unrestricted if the BS is a macro BS, and otherwise identifies the access type as restricted, wherein the information within the preamble further includes information that specifies that the BS is a low re-use type BS, wherein low re-use refers to use of only a portion of resources that are available for transmitting the wireless signal during a given time frame, wherein the available resources are shared by the BSs in the wireless access network, and wherein the available resources are selected from the group consisting of time, frequency, code and symbol-based resources.

39. The apparatus of claim 38, the data processor determines whether the non-serving sector employs restricted association by analyzing a restricted association bit of the system data.

40. The apparatus of claim 38, the data processor extracts a unique or semi-unique sector ID from the system data.

41. The apparatus of claim 40, further comprising an access module that compares the sector ID to a sector access list and activates the non-serving sector based on the comparison.

42. The apparatus of claim 38, the data processor scans a resource of the wireless signal in separate time cycles of the signal and obtains control channel information from the resource in one time cycle and the type of BS from the resource in another time cycle.

43. The apparatus of claim 38, further comprising a query module that transmits a message to the non-serving sector requesting an access authorization status.

44. The apparatus of claim 43, wherein the receiver obtains a response to the request indicating the access authorization status.

45. The apparatus of claim 44, the response is received on a broadcast control channel reserved for access authorization responses or received via unicast messaging.

46. The apparatus of claim 38, wherein the data processor obtains the system data and information from the preamble of the wireless signal.

47. The apparatus of claim 38, wherein the data processor at least one of:
   obtains from the system data a set of wireless signal resources blanked or transmitted at reduced power by the non-serving sector; or
   identifies the non-serving sector at least in part as a result of such sector transmitting the system data on the low re-use preamble.

48. An apparatus configured to facilitate wireless communication in a heterogeneous wireless access network that includes multiple instances of a macro base station (BS) whose access by mobile terminals is unrestricted, and at least one instance of a BS other than a macro BS, comprising:
   means for obtaining a wireless signal from a non-serving sector of the wireless access network;
   means for scanning one or more portions of the wireless signal for system data; and
   means for extracting, based on the scanning, information within at least one of a control channel and an acquisition pilot within a low re-use preamble from the system data that identifies an access type of a BS associated with the non-serving sector as unrestricted if the BS is a macro BS, and otherwise identifies the access type as restricted, wherein the information within the preamble further includes information that specifies that the BS is a low re-use type BS, wherein low re-use refers to use of only a portion of resources that are available for transmitting the wireless signal during a given time frame, wherein the available resources are shared by the BSs in the wireless access network, and wherein the available resources are selected from the group consisting of time, frequency, code and symbol-based resources.

49. At least one processor configured to facilitate wireless communication in a heterogeneous wireless access network that includes multiple instances of a macro base station (BS) whose access by mobile terminals is unrestricted, and at least one instance of a BS other than a macro BS, comprising:
   a first module configured to obtain a wireless signal from a non-serving sector of the wireless access network;
   a second module configured to scan one or more portions of the wireless signal for system data; and
   a third module configured to extract, based on the scanning, information within at least one of a control channel and an acquisition pilot within a low re-use preamble from the system data that identifies an access type of a BS associated with the non-serving sector as unrestricted if the BS is a macro BS, and otherwise identifies the access type as restricted, wherein the information within the preamble further includes information that specifies that the BS is a low re-use type BS, wherein low re-use refers to use of only a portion of resources that are available for transmitting the wireless signal during a given time frame, wherein the available resources are shared by the BSs in the wireless access network, and wherein the available resources are selected from the group consisting of time, frequency, code and symbol-based resources.

50. A non-transitory computer-readable medium containing instructions stored thereon, which, when executed by an apparatus, cause the apparatus to perform operations for wireless communication in a heterogeneous wireless access network that includes multiple instances of a macro base station (BS) whose access by mobile terminals is unrestricted, and at least one instance of a BS other than a macro BS, the instructions comprising:
- a first set of codes for causing a computer to obtain a wireless signal from a non-serving sector of a the wireless access network;
- a second set of codes for causing the computer to scan one or more portions of the wireless signal for system data; and
- a third set of codes for causing the computer to extract, based on the scanning, information within at least one of a control channel and an acquisition pilot within a low re-use preamble from the system data that identifies an access type of a BS associated with the non-serving sector as unrestricted if the BS is a macro BS, and otherwise identifies the access type as restricted, wherein the information within the preamble further includes information that specifies that the BS is a low re-use type BS, wherein low re-use refers to use of only a portion of resources that are available for transmitting the wireless signal during a given time frame, wherein the available resources are shared by the BSs in the wireless access network, and wherein the available resources are selected from the group consisting of time, frequency, code and symbol-based resources.

* * * * *